United States Patent
Mima et al.

(10) Patent No.: US 7,060,341 B2
(45) Date of Patent: Jun. 13, 2006

(54) STRETCHABLE CONVEYER BELT AND METHOD OF PRODUCING SAME

(75) Inventors: Masashi Mima, Niwa-gun (JP); Osamu Jibu, Tazimi (JP); Katsuya Teramoto, Numazu (JP); Shinichi Saruyama, Numazu (JP)

(73) Assignees: Bando Chemical Industries, Ltd. (JP); Ishikawajima Transport Machinery Co., Ltd. (JP)

( * ) Notice: Subject to any disclaimer, the term of this patent is extended or adjusted under 35 U.S.C. 154(b) by 531 days.

(21) Appl. No.: 10/067,547

(22) Filed: Feb. 7, 2002

(65) Prior Publication Data

US 2002/0110676 A1 Aug. 15, 2002

(30) Foreign Application Priority Data

Feb. 9, 2001 (JP) ....................... 2001-034550
Dec. 27, 2001 (JP) ....................... 2001-398229

(51) Int. Cl.
*B32B 3/00* (2006.01)

(52) U.S. Cl. .................. 428/162; 428/174; 428/910; 198/847; 198/821; 198/220

(58) Field of Classification Search ............ 428/162, 428/174, 910, 212, 287, 292.1; 198/847, 198/821, 220
See application file for complete search history.

(56) References Cited

U.S. PATENT DOCUMENTS

| | | | |
|---|---|---|---|
| 3,310,161 A | 3/1967 | Kraft, Jr. | ............... 198/193 |
| 3,323,637 A | 6/1967 | Jenkins | |
| 4,085,840 A | 4/1978 | Hayashi | ............... 198/472 |
| 4,184,589 A * | 1/1980 | Habegger | ............... 198/847 |
| 4,681,646 A * | 7/1987 | Pinto et al. | ............... 156/157 |
| 4,769,202 A * | 9/1988 | Eroskey et al. | ............... 264/166 |
| 5,038,919 A * | 8/1991 | Harston | ............... 198/626.1 |
| 5,141,101 A * | 8/1992 | Vance et al. | ............... 198/847 |

FOREIGN PATENT DOCUMENTS

| | | |
|---|---|---|
| DE | 41 18 137 | 6/1992 |
| EP | 0 753 471 | 1/1997 |
| JP | 47-10288 | 3/1946 |
| JP | 49-42687 | 7/1947 |
| JP | 55-109609 | 1/1954 |
| JP | 53-18182 | 2/1978 |
| JP | 55-44195 | 3/1980 |
| JP | 10-139120 | 5/1998 |
| JP | 10-248336 | 9/1998 |
| JP | 2000-169066 A | 6/2000 |
| JP | 2000-169066 | 6/2000 |

* cited by examiner

*Primary Examiner*—Merrick Dixon
(74) *Attorney, Agent, or Firm*—Parkhurst & Wendel, L.L.P.

(57) ABSTRACT

A stretchable conveyor belt having a plurality of first cuts which extend in a widthwise direction of the belt, which extend from one of opposite surfaces of the belt toward the other surface thereof and do not reach said other surface, and which are provided at a regular interval of distance in a lengthwise direction of the belt, and/or a plurality of second cuts which extend in the widthwise direction of the belt, which extend from said other surface of the belt toward said one surface thereof and do not reach said one surface, and which are provided at a regular interval of distance in the lengthwise direction of the belt, the first cuts and/or the second cuts providing a stretchability of the belt.

7 Claims, 26 Drawing Sheets

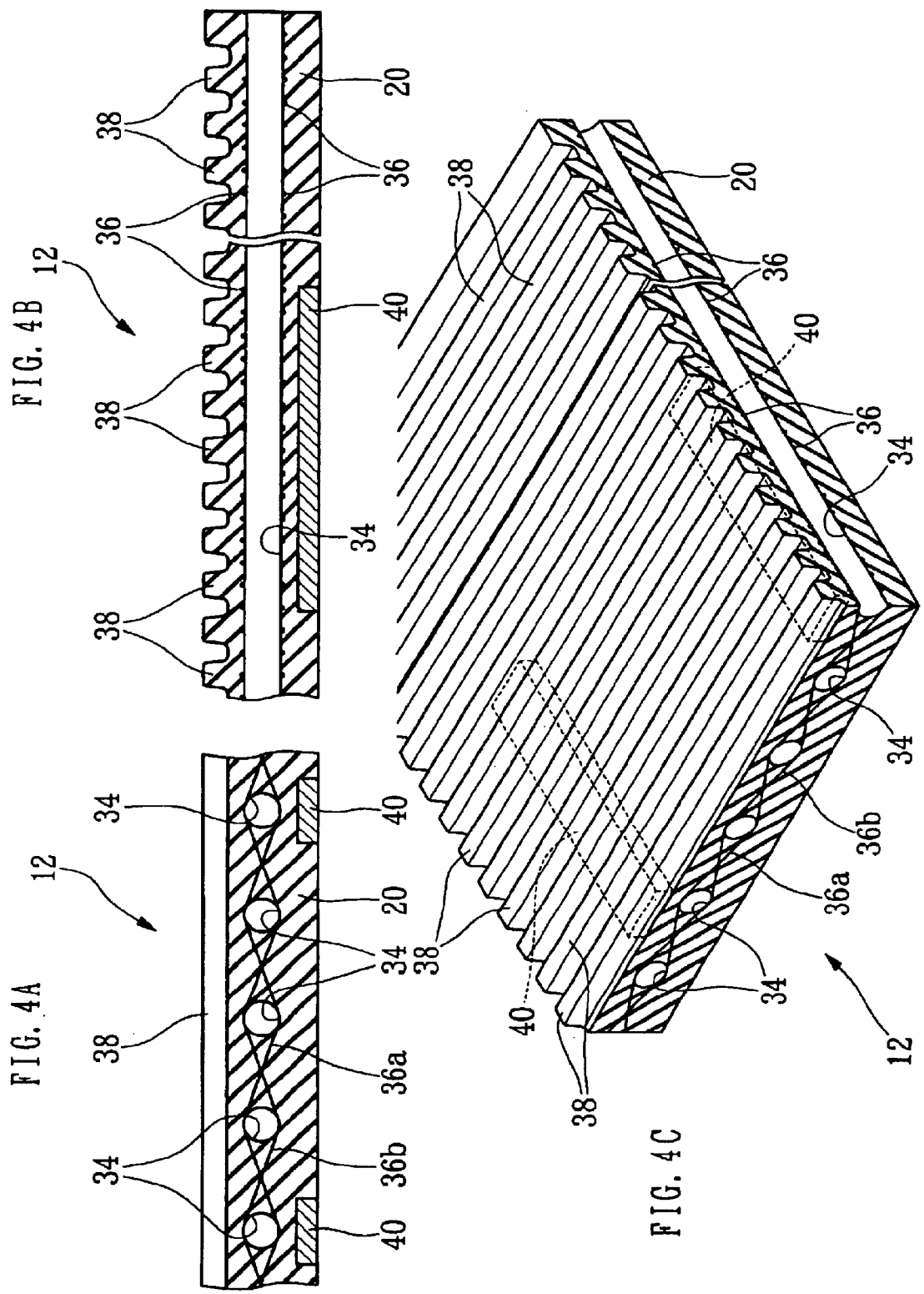

FIG. 10A
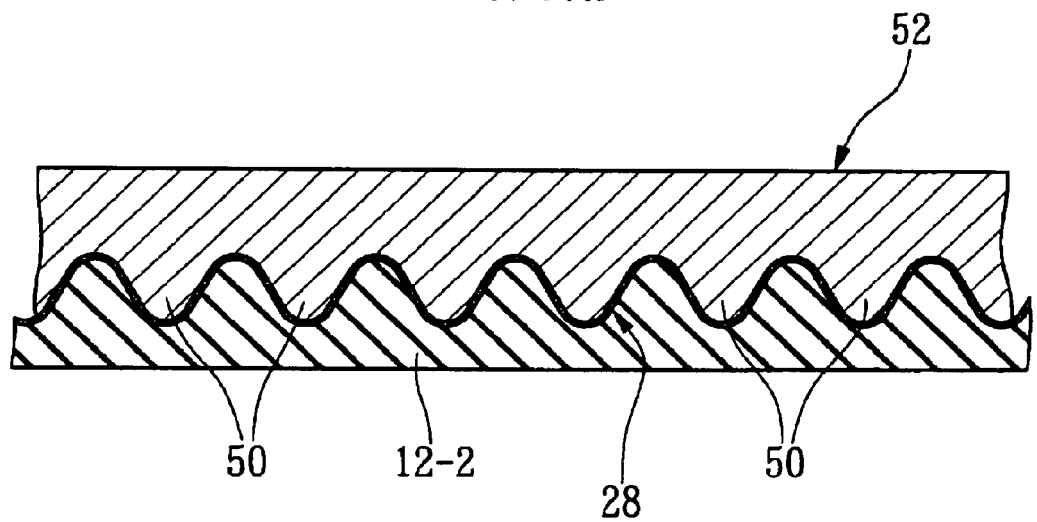
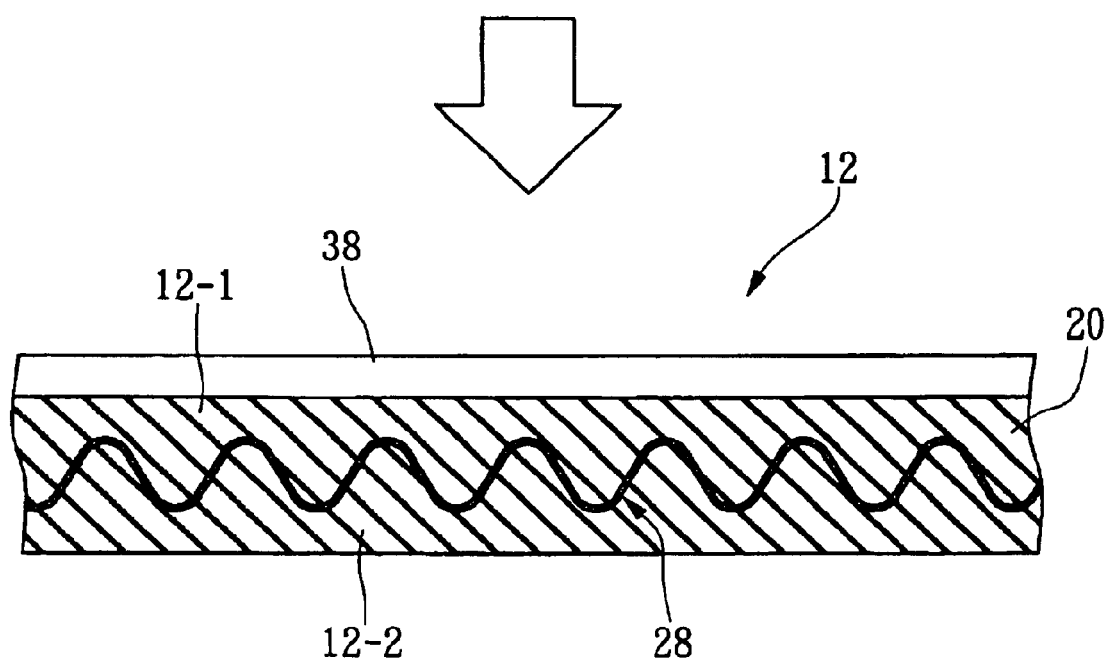
FIG. 10B

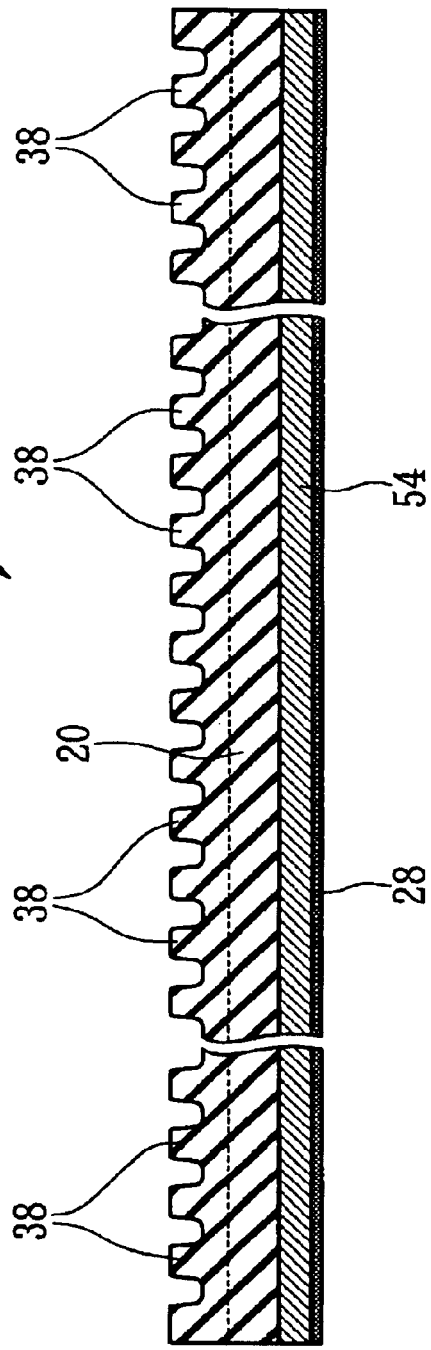
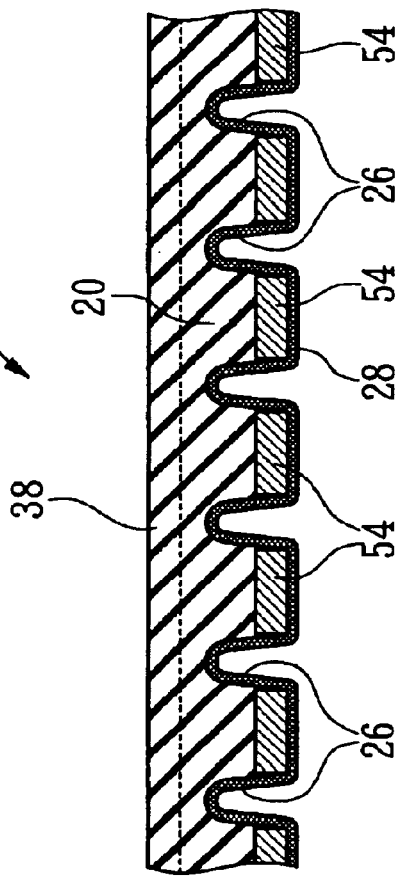

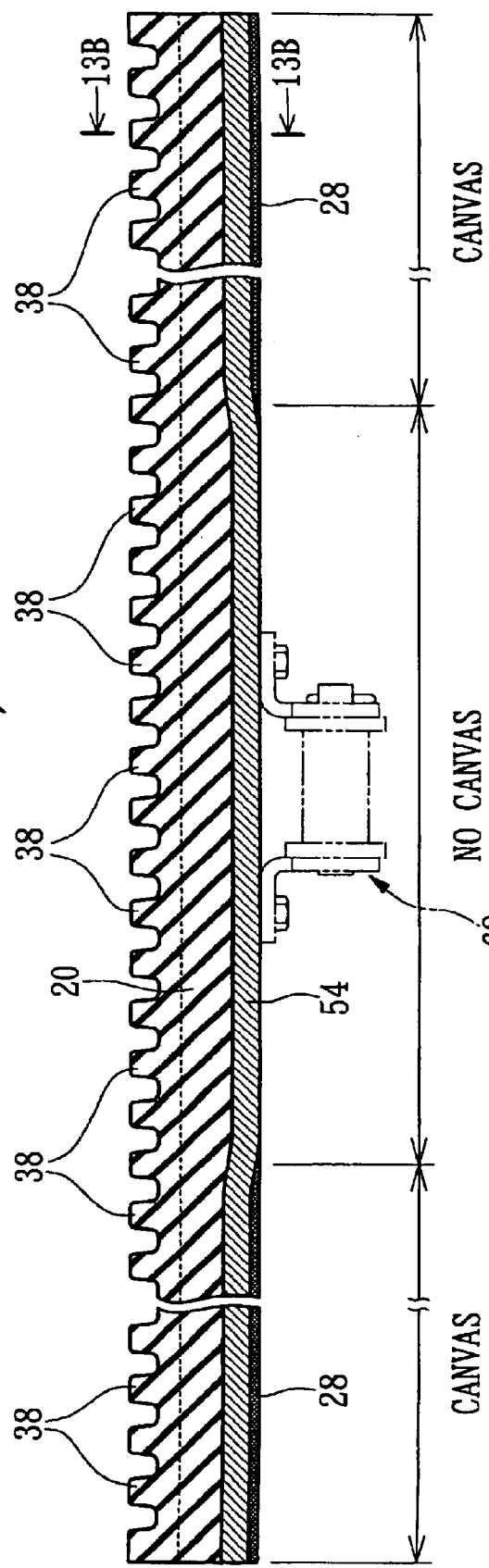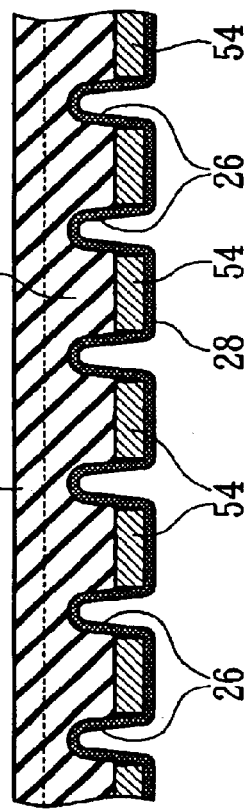

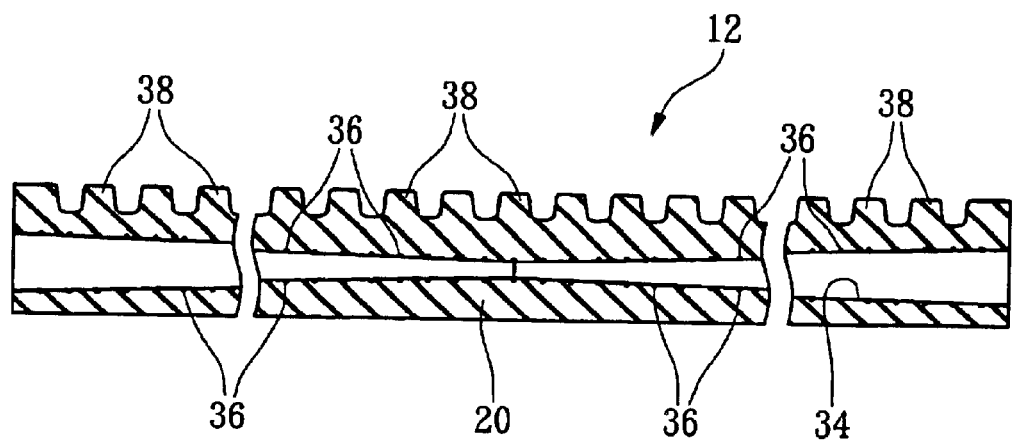
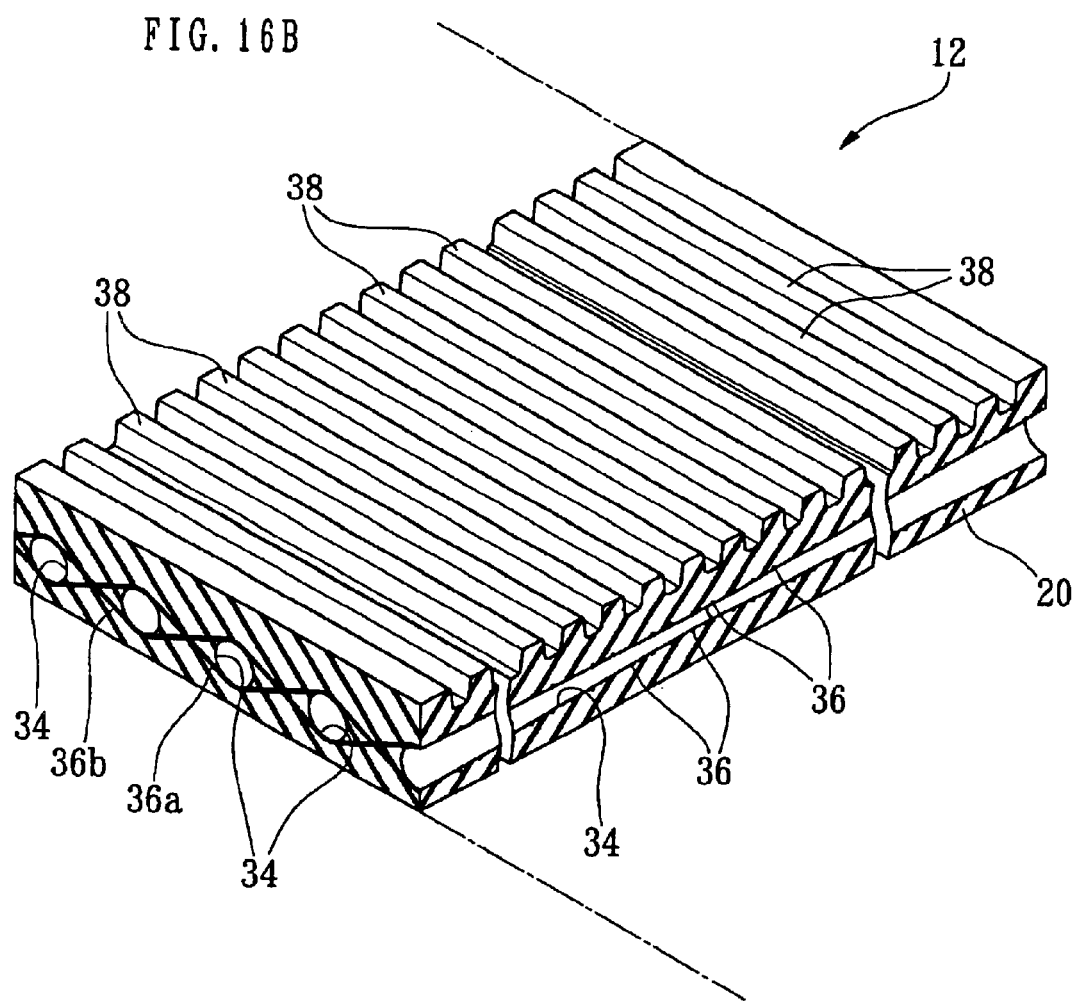

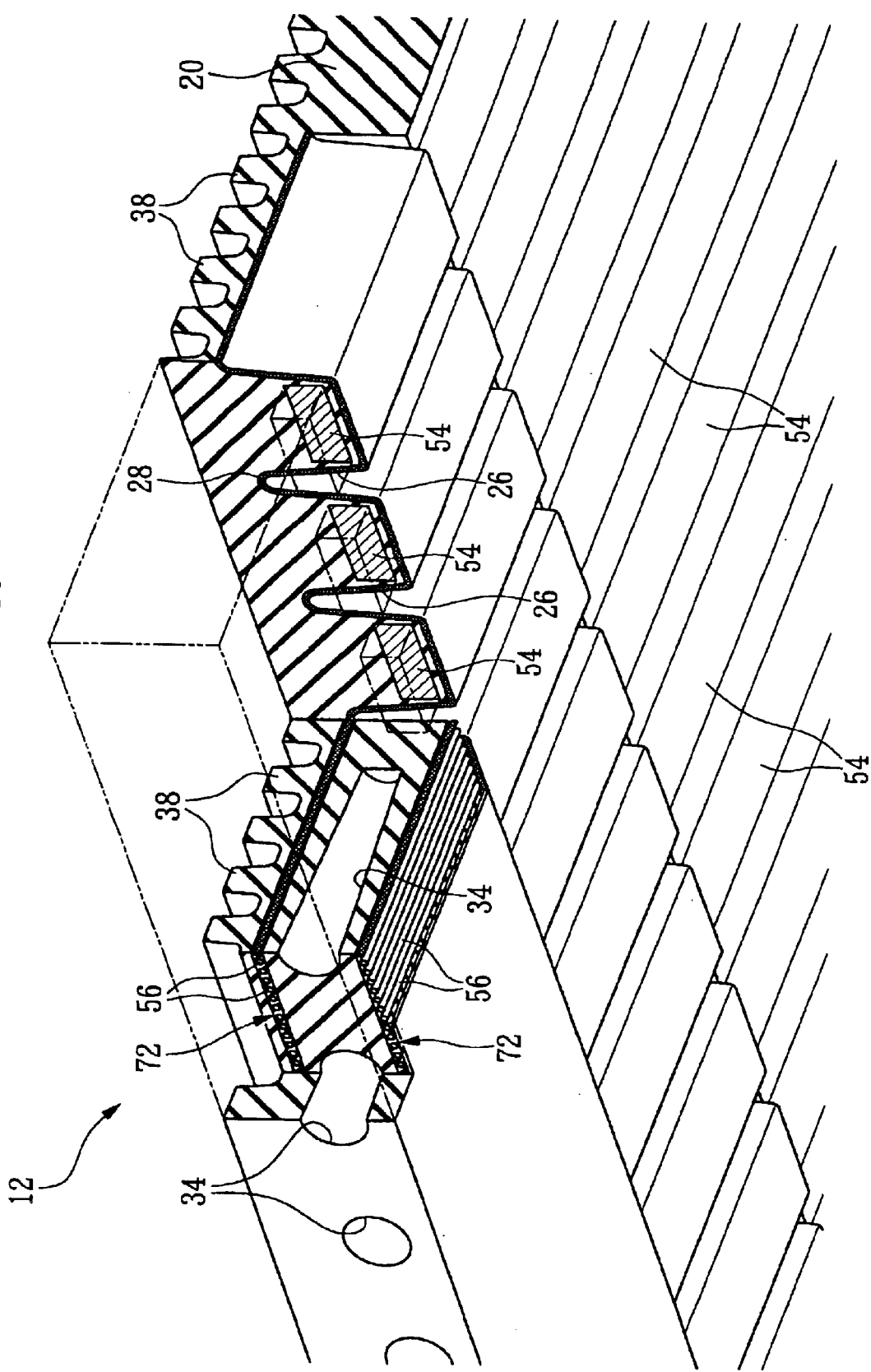

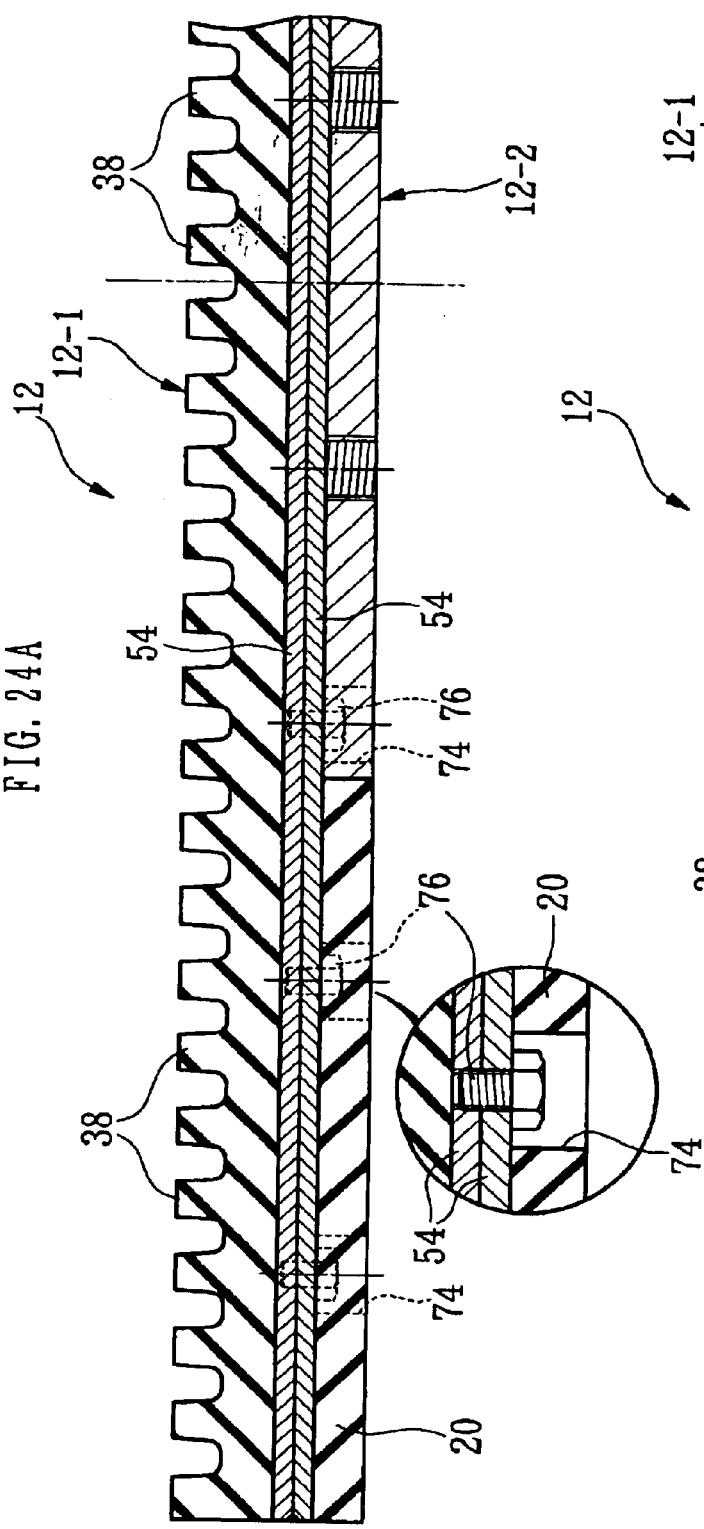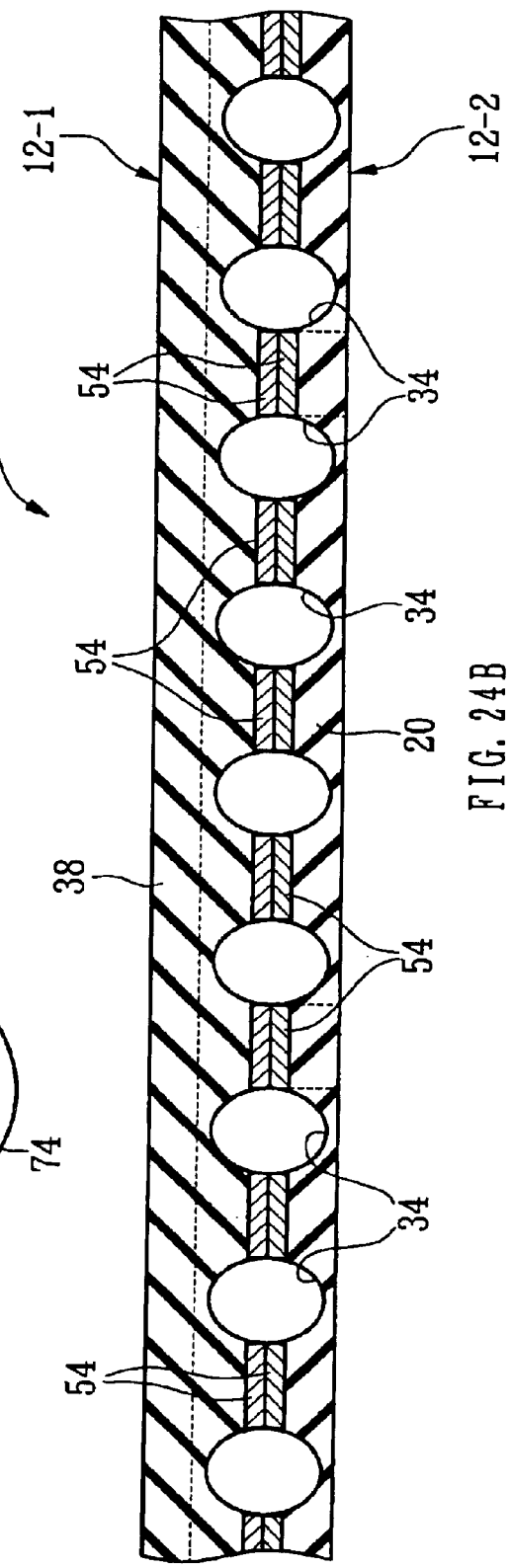

PRIOR ART

US 7,060,341 B2

STRETCHABLE CONVEYER BELT AND METHOD OF PRODUCING SAME

BACKGROUND OF THE INVENTION

1. Field of the Invention

The present invention relates to a stretchable conveyor belt and a method of producing the stretchable conveyor belt, and particularly to a conveyor belt suitable for conveying persons such as pedestrians and a method of producing the conveyor belt.

2. Related Art Statement

In a recent aging society, there has been a strong demand for barrier-free facilities.

A pedestrian overpass having stairs provides a barrier to old people. To solve this problem, there has been proposed to replace the stairs of the overpass with a curved-path pedestrian conveyor belt which can be moved up and down along a spirally curved loop path. This conveyor belt will release pedestrians from going up and down the stairs.

In addition, in a recent speed-up society, there has been a demand for conveying pedestrians at a high speed. In particular, there has been a strong demand for a variable-speed pedestrian conveyor belt which can be moved at variable speeds.

At specific locations where pedestrians step onto, and off, the variable-speed pedestrian conveyor belt, the conveyor belt can be moved at low speeds; and at other locations than those specific locations, the conveyor belt can be moved at high speeds. Thus, the conveyor belt can convey the pedestrians at increased speeds.

However, a conventional belt includes a belt-reinforcing material, such as a reinforcing canvas sheet or steel cords, that is embedded therein to provide a lengthwise tensile force thereof. Therefore, the conventional belt has substantially no lengthwise stretchability and accordingly cannot be used as the above-described curved-path pedestrian conveyor belt or variable-speed pedestrian conveyor belt.

FIGS. 26A and 26B show examples of the conventional belt. FIG. 26A shows a belt including tension canvas sheets 200, each as a belt-reinforcing material, that are embedded therein; and FIG. 26B shows a belt including steel cords 202, each as a belt-reinforcing material, that are embedded therein.

In those figures, reference numerals 204, 206 and 208 designate an upper cover rubber, a lower cover rubber, and a cushion rubber.

When the curved-path pedestrian conveyor belt is moved along a curved portion of the loop path, a widthwise inner half portion of the conveyor belt needs to contract in a lengthwise direction of the belt, and a widthwise outer half portion of the belt needs to stretch in the lengthwise direction. However, in the conventional conveyor belt, the tension canvas sheets 200 or the steel cords 202 as the belt-reinforcing members are embedded in the rubber layers such that the canvas sheets 200 or the steel cords 202 are extended out and binds the rubber layers in the lengthwise direction over the entire width. Thus, the conventional belt cannot be moved along the curved portion or portions of the loop path.

Where the specific locations where pedestrians step onto, and off, the variable-speed pedestrian conveyor belt, the conveyor belt needs to be stretched out in the lengthwise direction over the entire width; and at other locations than those specific locations, the conveyor belt needs to be contracted in the lengthwise direction over the entire width.

However, for the same reasons as described above, the conventional belt cannot be moved in that manner and accordingly cannot be used as the variable-speed pedestrian conveyor belt.

While the problems of the pedestrian conveyor belts have been described above, those problems commonly occur to the curved-path conveyor belts and the variable-speed conveyor belts.

Thus, a curved-path or variable-speed conveyor belt needs to be formed such that widthwise opposite side portions of the belt have a lengthwise stretchability or such that an entire width of the belt has a lengthwise stretchability. However, there remains the problem of how to form the conveyor belt.

SUMMARY OF THE INVENTION

It is therefore an object of the present invention to provide a stretchable conveyor belt and a method of producing the same, each of which is free of the above-described problems.

The above object has been achieved by each of the following features of the present invention:

(1) A stretchable conveyor belt having at least one of (a) a plurality of first cuts which extend in a widthwise direction of the belt, which extend from one of opposite surfaces of the belt toward the other surface thereof and do not reach the other surface, and which are provided at a regular interval of distance in a lengthwise direction of the belt, and (b) a plurality of second cuts which extend in the widthwise direction of the belt, which extend from the other surface of the belt toward the one surface thereof and do not reach the one surface, and which are provided at a regular interval of distance in the lengthwise direction of the belt, wherein the at least one of (a) the first cuts and (b) the second cuts provide a stretchability of the belt.

According to the first feature, the conveyor belt has the cuts, each extending in its widthwise direction, at a predetermined interval of distance in its lengthwise direction. Those cuts can enhance the lengthwise stretchability of the belt.

For example, in the case where the conveyor belt has the cuts in its widthwise opposite side portions, the cuts can enhance the stretchability of the widthwise opposite side portions of the belt. Thus, the conveyor belt can be advantageously used as a curved-path conveyor belt which is moved or circulated along a curved loop path.

In addition, in the case where the conveyor belt has the cuts over its entire width, the cuts can enhance the lengthwise stretchability of the belt over its entire width.

In the latter case, the conveyor belt can be advantageously used as not only a curved-path conveyor belt but also a variable-speed conveyor belt.

Even in the case where the conveyor belt has the cuts in its widthwise opposite side portions only, a widthwise central portion of the belt may have a stretchability owing to an elasticity of rubber. In this case, the conveyor can be used as a curved-path conveyor belt which can be moved along a more sharply curved portion of the loop path, or alternatively as a variable-speed conveyor belt.

However, the conveyor belt may employ, in place of the cuts, other sorts of means for enhancing the stretchability of the belt. In the latter case, too, the conveyor belt can enjoy the same advantages as described above.

Either in the case where the conveyor belt has the enhanced stretchability in its widthwise opposite side portions only, or in the case where the conveyor belt has the enhanced stretchability over its substantially entire width, the belt may be stretched or lengthened by 10 percent or more. That is, the length of the belt being stretched may be 1.1 times or more longer than the original length of the belt.

More preferably, the conveyor belt may be stretched by 50 percent or more, by 80 percent or more, by 100 percent or more, and most preferably by 150 percent or more. The upper limit of stretching of the conveyor belt may be 300 percent.

(2) A stretchable conveyor belt according to the first feature (1), having both (a) the first cuts and (b) the second cuts, wherein the first cuts and the second cuts are alternate with each other in the lengthwise direction of the belt.

According to this feature, the conveyor belt enjoys a higher lengthwise stretchability than that of the conveyor belt having either the first or second cuts only.

(3) A stretchable conveyor belt having a plurality of recesses which extend in a widthwise direction of the belt, which extend from one of opposite surfaces of the belt toward the other surface thereof, and which are provided at a regular interval of distance in a lengthwise direction of the belt, wherein the recesses provide a stretchability of the belt.

According to this feature, the recesses can enhance a lengthwise stretchability of the conveyor belt.

In the case where the conveyor belt has the recesses in its widthwise opposite side portions, those recesses can enhance the stretchability of the widthwise side portions of the belt. Therefore, the conveyor belt can be advantageously used as a curved-path conveyor belt.

In addition, in the case where the conveyor belt has the recesses in its substantially entire width, those recesses can enhance the stretchability of the belt over its entire width. Therefore, the conveyor belt can be advantageously used as not only a curved-path conveyor belt but also a variable-speed conveyor belt.

(4) A stretchable conveyor belt, comprising:

an upper layer;

a lower layer; and an intermediate portion located between the upper and lower layers, wherein at least one of the upper layer and the lower layer is integrally formed over an entire width of the belt, wherein the intermediate portion has a plurality of voids which extend in a widthwise direction of the belt and are provided at a regular interval of distance in a lengthwise direction of the belt, and wherein the voids provide a stretchability of the conveyor belt.

According to this feature, the voids can enhance the lengthwise stretchability of the conveyor belt.

In the case where the conveyor belt has the voids in its widthwise opposite side portions, those voids can increase the stretchability of the widthwise opposite side portions of the belt. Thus, the conveyor belt can be advantageously used as a curved-path conveyor belt (see the eleventh feature (11)).

In addition, in the case where the conveyor belt has the voids in its substantially entire width, the belt can be advantageously used as a variable-speed conveyor belt (see the twelfth feature (12)).

The conveyor belt according to the fourth feature (4) may be produced as follows:

First, the upper and lower layers of the conveyor belt are formed separately from each other, such that the upper layer has, in a lower surface thereof, respective upper portions of the voids, and the lower layer has, in an upper surface thereof, respective lower portions of the voids, and then the upper and lower layers are superposed on, and fixed to, each other to provide the conveyor belt having the voids in the intermediate portion thereof as seen in the direction of thickness thereof (see the twenty-third feature (23)).

Thus, the conveyor belt having the voids in its thickness-wise intermediate portion can be easily produced.

(5) A stretchable conveyor belt having at least one void which is provided in an intermediate portion of the belt as seen in a direction of thickness thereof, which extends in a widthwise direction of the belt, and which is gradually widened in at least one direction toward at least one of widthwise opposite ends of the belt, and wherein the void provides a stretchability of the conveyor belt.

According to this feature, the one or more voids that are provided in the thicknesswise intermediate portion of the conveyor belt are so shaped as to be gradually widened in one direction or opposite directions toward one or both of widthwise opposite ends of the belt. This specific shape of the void or voids can increase the lengthwise stretchability of the conveyor belt in the one direction or the opposite directions toward the one or both of the widthwise opposite ends of the belt.

The conveyor belt according to this feature can be advantageously used as a curved-path conveyor belt which can be moved along a curved loop path including a curved portion having a small radius of curvature. That is, the present conveyor belt can be moved along a sharply curved portion of the loop path.

In the case where the conveyor belt has the void or voids in its substantially entire width, the conveyor belt can be used as a variable-speed conveyor belt.

(6) A stretchable conveyor belt according to the fourth or fifth feature (4) or (5), further comprising at least one pair of first and second flexible reinforcing threads which extend in the lengthwise direction of the belt, and which include a plurality of first curved or bent portions and a plurality of second curved or bent portions, respectively, in the lengthwise direction, such that the first curved or bent portions and the second curved or bent portions have opposite phases, respectively, and are turned around the voids, respectively.

According to this feature, the reinforcing threads can prevent the conveyor belt from being excessively stretched in its lengthwise direction over a certain limit, thereby preventing the belt from being damaged or broken because of the excessive stretching.

(7) A stretchable conveyor belt comprising a flexible belt-reinforcing material which extends in a lengthwise direction of the belt and includes a plurality of curved or bent portions in the lengthwise direction, wherein the curved or bent portions of the belt-reinforcing material provide a stretchability of the conveyor belt.

According to this feature, the shape of the curved or bent portions of the belt-reinforcing material can assure the lengthwise stretchability of the conveyor belt.

In the case where the conveyor belt has, in each of its widthwise opposite side portions, the belt-reinforcing material including a plurality of curved or bent portions in the lengthwise direction of the belt, the belt-reinforcing material can increase the lengthwise stretchability of the each of the widthwise opposite side portions of the belt. Thus, the conveyor belt can be used as a curved-path conveyor belt.

In addition, in the case where the conveyor belt has the belt-reinforcing material in its substantially entire width, the belt can be used as a variable-speed conveyor belt.

According to the seventh feature (7), the belt-reinforcing material can function, when being stretched out with the conveyor belt, as a stopper which can prevent the belt from being excessively stretched over a certain limit.

(8) A stretchable conveyor belt according to the seventh feature (7), wherein the belt-reinforcing material extends over a substantially entire width of the belt except for widthwise opposite margin rubber portions of the belt.

According to this feature, the conveyor belt can be produced with higher efficiency.

(9) A stretchable conveyor belt according to the seventh or eighth feature (7) or (8), wherein the belt-reinforcing material is embedded in an intermediate portion of the belt as seen in a direction of thickness thereof.

(10) A stretchable conveyor belt according to any one of the seventh to ninth features (7) to (9), wherein the belt-reinforcing material comprises a tension canvas sheet.

(11) A stretchable conveyor belt according to any one of the first to tenth features (1) to (10), wherein the belt has the strechability in at least widthwise opposite side portions thereof.

(12) A stretchable conveyor belt according to any one of the seventh to tenth features (1) to (10), wherein the belt has the strechability over a substantially entire width thereof.

(13) A stretchable conveyor belt according to the eleventh or twelfth features (11) or (12), wherein the belt has a higher strechability in the widthwise opposite side portions thereof, than a strechability in a widthwise central portion thereof.

According to this feature, the conveyor belt can be advantageously used as a curved-path conveyor belt. In the case where the conveyor belt has some lengthwise stretchability also in its widthwise central portion, the conveyor belt can also be used as a variable-speed conveyor belt.

(14) A stretchable conveyor belt comprising a tension canvas sheet which is provided in a widthwise central portion of the belt to reinforce the belt, and which binds the widthwise central portion of the belt such that the widthwise central portion is not stretchable in a lengthwise direction of the belt, wherein the tension canvas sheet is not provided in widthwise opposite side portions of the belt, so that the widthwise opposite side portions of the belt have a stretchability.

According to this feature, only the widthwise opposite side portions of the conveyor belt have some stretchability. Thus, the conveyor belt can be advantageously used as a curved-path conveyor belt.

(15) A stretchable conveyor belt according to any one of the first to fourteenth features (1) to (14), further comprising a plurality of transverse rigid plates which extend in the widthwise direction of the belt and are provided at a regular interval of distance in the lengthwise direction of the belt, wherein the transverse rigid plates provide a transverse rigidity of the belt.

According to this feature, the transverse rigid plates can provide a transverse or widthwise rigidity of the conveyor belt, without lowering the lengthwise stretchability of the belt.

Therefore, for example, in the case where the widthwise opposite end portions of the conveyor belt are supported by respective rollers, the transverse rigid plates can effectively prevent the widthwise central portion of the belt from sagging downward.

In addition, the transverse rigid plates can prevent the conveyor belt from contracting in its widthwise direction.

The reason for the transverse rigid plates to be able to prevent the widthwise contraction of the conveyor belt is that the rigid plates are integrally formed (e.g., upon vulcanization of rubber) and, when the belt is stretched in a direction of movement thereof (i.e., in its lengthwise direction), the rigid plates prevent the belt from contracting in its widthwise direction, while assuring that the belt maintains its constant width.

(16) A stretchable conveyor belt according to any one of the first to fourteenth features (1) to (14), further comprising a plurality of transverse rigid members which provide at least two layers that extend in the widthwise direction of the belt and are spaced from each other in a direction of thickness of the belt, wherein the transverse rigid members provide a transverse rigidity of the belt.

According to this feature, the conveyor belt enjoys a high transverse rigidity and accordingly a high load-supporting capability.

(17) A stretchable conveyor belt according to the sixteenth feature (16), wherein the transverse rigid members comprise a plurality of wires.

Alternatively, it is possible to employ both transverse rigid plates and wires which extend in the widthwise direction of the conveyor belt and provide a transverse rigidity of the belt.

In the case where the widthwise opposite end portions of the conveyor belt according to the present invention are supported by respective rollers, the widthwise opposite end portions may have, in their lower surfaces, cuts or recesses that provide the stretchability of the belt.

However, the above-described conveyor belt has the problem of producing abrupt vertical vibration or impact when the cuts or the recesses overcome the rollers. Hence, the following eighteenth feature (18) may be employed.

(18) A stretchable conveyor belt comprising widthwise opposite end portions which are adapted to be supported by respective rollers and each of which has at least one void in an intermediate portion thereof as seen in a direction of thickness thereof, wherein the void provides a stretchability of the each of the widthwise opposite end portions of the belt; and a plurality of wires which provide at least one layer on at least a lower side of the void of the each of the widthwise opposite end portions of the belt, wherein the wires provide a transverse rigidity of the belt.

According to this feature, the void or voids increase the lengthwise stretchability of the widthwise opposite end portions of the conveyor belt, and additionally prevent the belt from producing abrupt vertical vibration or impact when the belt runs over the rollers. Thus, the belt can be smoothly moved over the rollers.

In addition, since the wires in the form of one or more layers are provided below the void or voids, the rollers can effectively support the widthwise opposite end portions of the conveyor belt, in spite of the presence of the void or voids. Thus, the conveyor belt enjoys a high load-supporting capability.

(19) A stretchable conveyor belt according to the eighteenth feature (18), wherein the conveyor belt has, in each of respective lower surfaces of respective portions of the belt that are nearer than the respective voids of the widthwise opposite side portions of the belt, to a widthwise central portion of the belt, a plurality of recesses which extend in the widthwise direction of the belt and are provided at a regular interval of distance in the lengthwise direction of the belt, and wherein the recesses cooperate with the voids to provide a stretchability of the belt.

According to this feature, the widthwise opposite side portions of the conveyor belt enjoys a high stretchability.

(20) A stretchable conveyor belt according to the eighteenth or nineteenth features (18) or (19), wherein a widthwise central portion of the belt has a stretchability owing to an elasticity of rubber.

According to this feature, the lengthwise stretchability of the widthwise central portion of the conveyor belt contributes to enabling the widthwise opposite side portions of the belt to be stretched or contracted by a great mount. Therefore, even in the case where the conveyor belt is moved or circulated along a considerably sharply curved portion of the loop path, the belt can adequately follow the sharp curving of the loop path.

In addition, the stretchability of the widthwise central portion of the conveyor belt assures that the belt can be used as a variable-speed conveyor belt. Moreover, the stretchability of the widthwise central portion of the conveyor belt assures that the belt can be used as a curved-path and variable-speed conveyor belt.

(21) A stretchable conveyor belt according to any one of the first to twentieth features (1) to (20), for use as a person conveyor belt for conveying at least one person.

(22) A stretchable conveyor belt according to any one of the first to twenty-first features (1) to (21), wherein the stretchable conveyor belt comprises a circulateable endless belt, and an endless chain which is fixed to a back surface of the endless belt, such that the endless chain extends in a lengthwise direction of the endless belt and transmits a drive force produced by a drive device.

This stretchable conveyor belt can be preferably used as a curved-path conveyor belt.

In this case, since the belt is driven via the chain fixed to the back surface of the belt, the belt can be reliably driven and circulated while smoothly following a curved portion of a curved path.

For example, in the case where belt pulleys which are commonly used to drive belts are used to drive a conveyor belt, the conveyor belt may slide on the belt pulleys. In contrast thereto, since the present conveyor belt is driven via the chain fixed to the belt, the drive force produced by the drive device can be surely transmitted to the belt, without sliding of the belt, so that the belt can be smoothly moved.

Thus, the present conveyor belt can be preferably used as a pedestrian conveyor belt.

(23) A method of producing a stretchable conveyor belt according to the fourth feature (4), the method comprising the steps of:

forming the upper and lower layers separately from each other, such that the upper layer has, in a lower surface thereof, respective upper portions of the voids and the lower layer has, in an upper surface thereof, respective lower portions of the voids, and superposing, and fixing, the upper and lower layers on, and to, each other to provide the conveyor belt having the voids in the intermediate portion thereof as seen in the direction of thickness thereof.

(24) A method of producing a stretchable conveyor belt according to the fourth feature (4), the method comprising the steps of:

forming the conveyor belt with a plurality of bar members being embedded therein, and pulling the bar members out of the conveyor belt to form, in the belt, the voids corresponding to the bar members.

This conveyor belt having the voids in its thicknesswise intermediate portion can be easily produced.

When the voids are formed using the bar members according to this feature, the upper and lower layers may be integrally formed with each other. In the latter case, too, the voids can be easily formed in its thicknesswise intermediate portion of the belt.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 4A is a longitudinal cross-sectional view showing another conveyor belt as a third embodiment of the present invention;

FIG. 4B is a transverse cross-sectional view of the conveyor belt of FIG. 4A;

FIG. 4C is a partly cross-sectioned, perspective view of the conveyor belt of FIG. 4A;

FIG. 10A is a longitudinal cross-sectional view showing a first step of a manner in which another conveyor belt as a seventh embodiment of the present invention is produced;

FIG. 10B is a longitudinal cross-sectional view showing a second step of a manner in which the conveyor belt of FIG. 10A is produced;

FIG. 12A is a transverse cross-sectional view showing another conveyor belt as a ninth embodiment of the present invention;

FIG. 12B is a longitudinal cross-sectional view of the conveyor belt of FIG. 12A;

FIG. 13A is a transverse cross-sectional view showing another conveyor belt as a tenth embodiment of the present invention;

FIG. 13B is a longitudinal cross-sectional view of the conveyor belt of FIG. 13A;

FIG. 16A is a transverse cross-sectional view showing another conveyor belt as a thirteenth embodiment of the present invention;

FIG. 16B is a partly cross-sectioned, perspective view of the conveyor belt of FIG. 16A;

FIG. 23 is a partly cut away, and partly cross-sectioned, view of the conveyor belt of FIG. 20;

FIG. 24A is a transverse cross-sectional view showing another conveyor belt as a seventeenth embodiment of the present invention;

FIG. 24B is a longitudinal cross-sectional view showing the conveyor belt of FIG. 24A;

DETAILED DESCRIPTION OF PREFERRED EMBODIMENTS

Hereinafter, there will be described a preferred embodiment of the present invention in detail by reference to the drawings. The present embodiment relates to a conveyor belt for conveying pedestrians.

Figure 1:
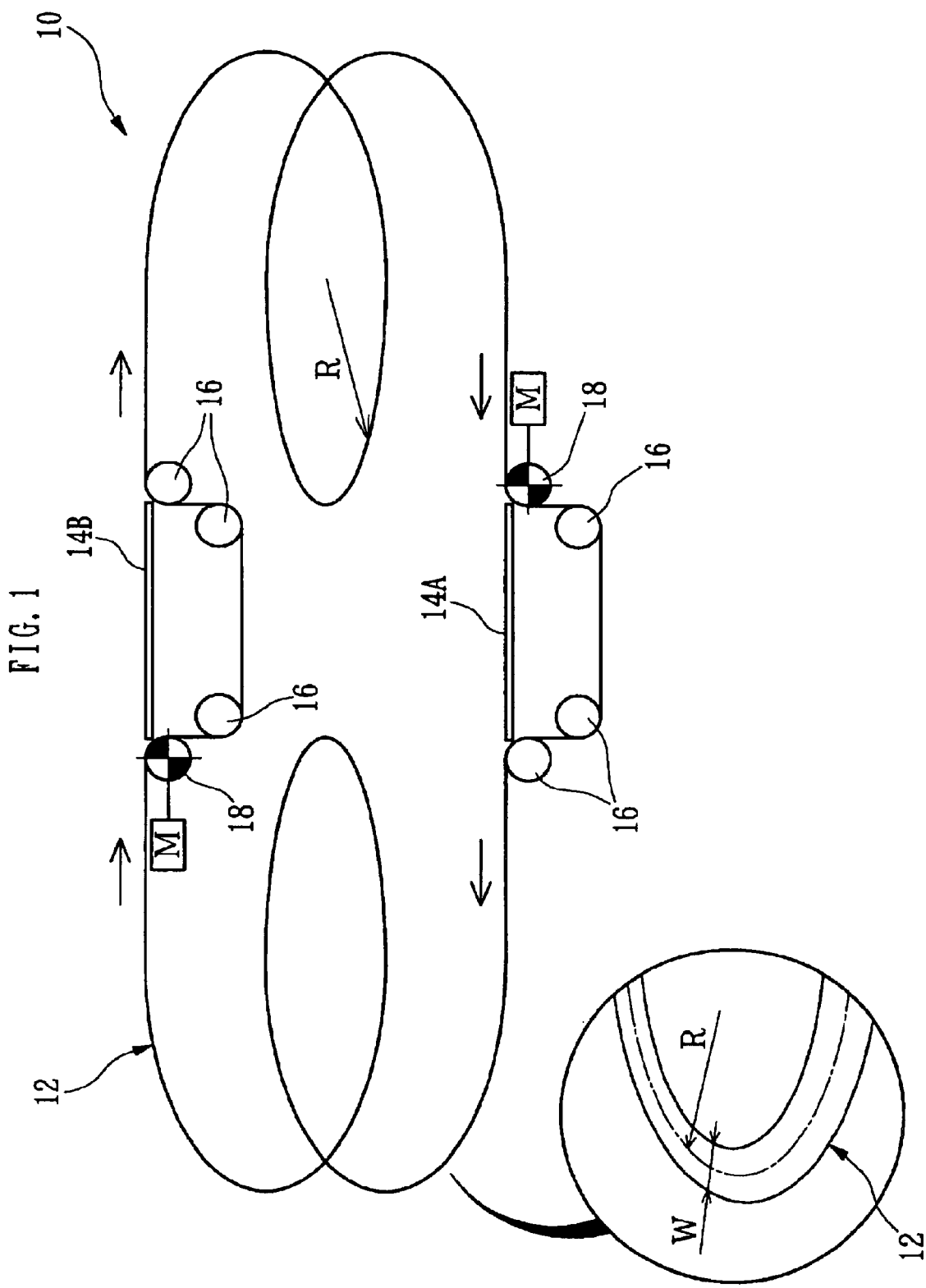
FIG. 1 is an illustrative view of a pedestrian conveying apparatus including a curved-path conveyor belt, to which the present invention is applied.

In FIG. 1, reference numeral 10 designates a curved-path-type pedestrian conveying apparatus which is used in place of winding staircases of a pedestrian overpass. The conveying apparatus 10 includes a conveyor belt 12 (hereinafter, abbreviated to the "belt") which is moved along a curved loop path.

The belt 12 starts with a lower station 14A, winds up from the lower station 14A to an upper station 14B, and then winds down from the upper station 14B to the lower station 14A. The belt 12 circulates along this curved loop path, while conveying one or more pedestrians from the lower station 14A to the upper station 14B, and from the upper station 14B to the lower station 14A.

A chain is fixed to a back surface of the belt 12, and a sprocket 18 is engaged with the chain. When the sprocket 18 is rotated, the belt 12 is driven. However, this is just an example of a chain-drive device.

In FIG. 1, reference numerals 16 designate pulleys. In addition, symbol "W" represents a width of the belt 12; and symbol "R" represents a radius of curvature of the belt 12.

Figure 2A:
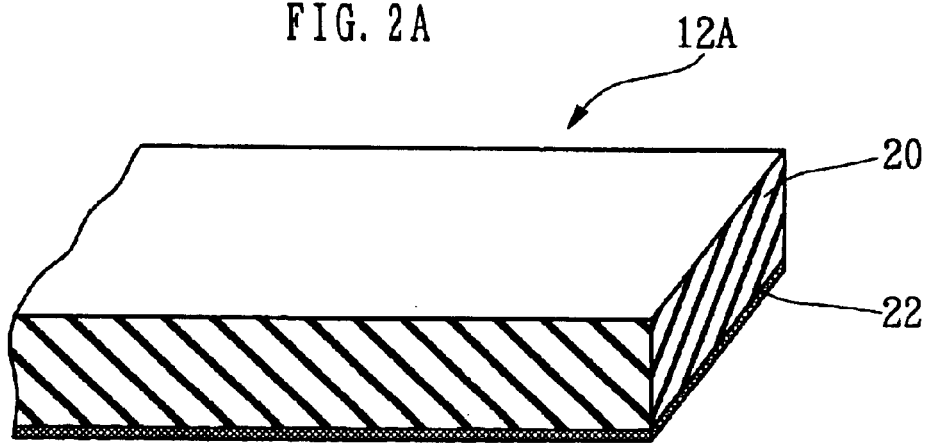
FIG. 2A is a partly cross-sectioned, perspective view showing the conveyor belt of FIG. 1 that is before cuts are formed therein.
Figure 2B:
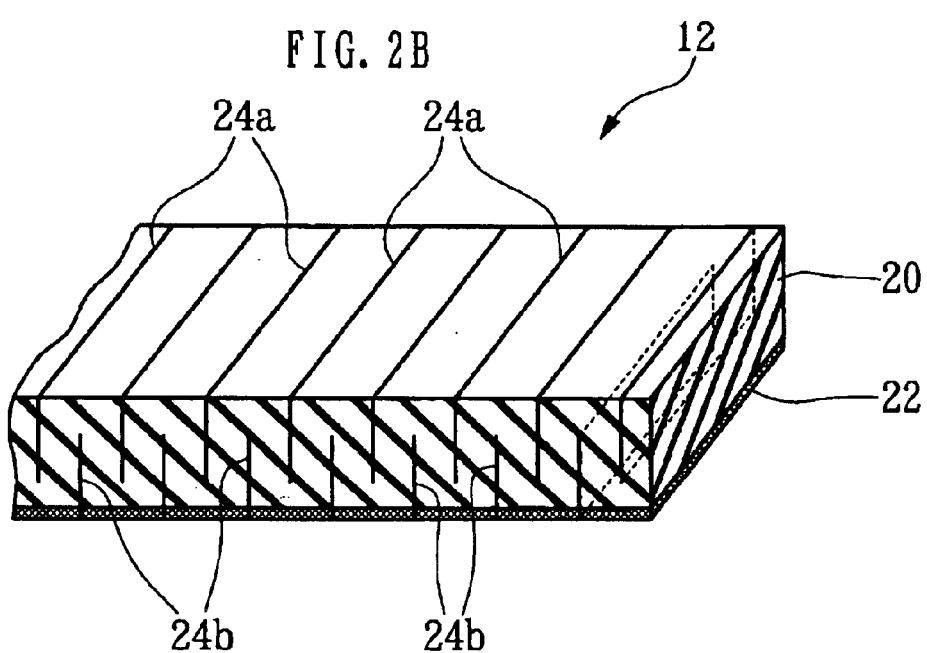
FIG. 2B is a partly cross-sectioned, perspective view showing the conveyor belt of FIG. 1 that has the cuts formed therein.
Figure 2C:
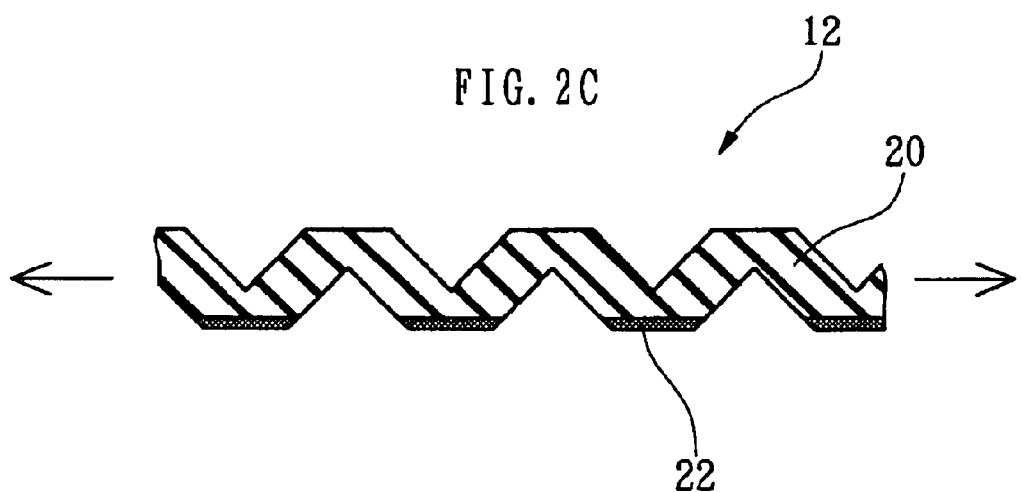
FIG. 2C is a longitudinal cross-sectional view showing the conveyor belt of FIG. 1 that is stretched out in its lengthwise direction.

FIGS. 2A, 2B, and 2C show a preferred example of the curved-path conveyor belt 12. As shown in the figures, the belt 12 is provided by a rubber layer 20, and a canvas sheet 22 fixedly attached to a lower surface of the rubber layer 20.

This belt 12 has a plurality of cuts 24a, 24b at a regular interval of distance in a lengthwise direction thereof, such that the upper cuts 24a and the lower cuts 24b are alternate with each other and such that each of the cuts 24a, 24b extends over an entire width of the belt 12.

Each of the upper cuts 24a extends from the upper surface of the belt 12 toward the lower surface thereof; and each of the lower cuts 24b extends from the lower surface of the belt 12 toward the upper surface thereof.

However, as shown in FIGS. 2B and 2C, the upper cuts 24a are not through-cuts, i.e., do not reach the lower surface of the belt 12; and the lower cuts 2b are not through-cuts, either, i.e., do not reach the upper surface of the belt 12.

The canvas sheet 22 is cut off by the lower cuts 24b into short lengths in the lengthwise direction of the belt 12. Thus, the canvas sheet 22 does not function as a reinforcing member which reinforces the belt 12 in its lengthwise direction.

The belt 12 is stretchable in its lengthwise direction, because of an elasticity of the rubber layer 20, and the cuts 24a, 24b formed at the regular interval of distance in the lengthwise direction enhance the lengthwise stretchability of the belt 12 over its entire width.

FIG. 2C shows the belt 12 stretched in its lengthwise direction.

As shown in the figure, the belt 12 can be largely stretched in its lengthwise direction, owing to the cuts 24a, 24b.

This belt 12 can be stretched in its lengthwise direction to an extent, when it breaks, that the belt 12 is about 2.5 times longer than its original length.

Since the cuts 24a, 24b extend over the entire width of the belt 12, the belt 12 has the stretchability over its entire width. In addition, since the cuts 24a, 24b are formed at the regular interval of distance in the lengthwise direction of the belt 12, the belt 12 has a uniform stretchability in its lengthwise direction.

Therefore, this belt 12 can be preferably used as not only the curved-path conveyor belt but also a variable-speed conveyor belt.

In FIG. 2A, reference numeral 12A designates an initial belt 12 before the cuts 24a, 24b are formed therein. In this belt 12A, the canvas sheet 22 is continuous in the lengthwise direction of the belt 12.

The provision of the canvas sheet 22 facilitates the continuous formation of the initial belt 12A.

When the cuts 24a, 24b are formed in the initial belt 12A, the canvas sheet 22 is cut off into short lengths. At that time, the canvas sheet 22 loses its conventional function as the reinforcing member that reinforces the belt in use.

Thus, basically, only the rubber layer 20 gives the belt 12 its essential function as the pedestrian conveying belt.

In the case where this belt 12 is employed in the pedestrian conveying apparatus 10 shown in FIG. 1, the chain is attached to the widthwise central portion of the back surface of the belt 12, and the sprocket 18 is engaged with the chain and is driven.

This is the case with each of the following embodiments.

When this belt 12 moves along a curved portion of the loop path shown in FIG. 1, an inside portion of the belt 12 contracts in the lengthwise direction of the belt 12 while an outside portion of the belt 12 stretches in the same direction. Thus, the belt 12 as a whole can smoothly move along the curved loop path while adequately following large and small curvatures of the loop path.

In addition, since the upper and lower cuts 24a, 24b are alternate with each other in the lengthwise direction of the belt 12, the belt 12 as a whole can enjoy a higher lengthwise stretchability than that of a belt which has either the upper cuts 24a or the lower cuts 24b only.

Figure 3A:
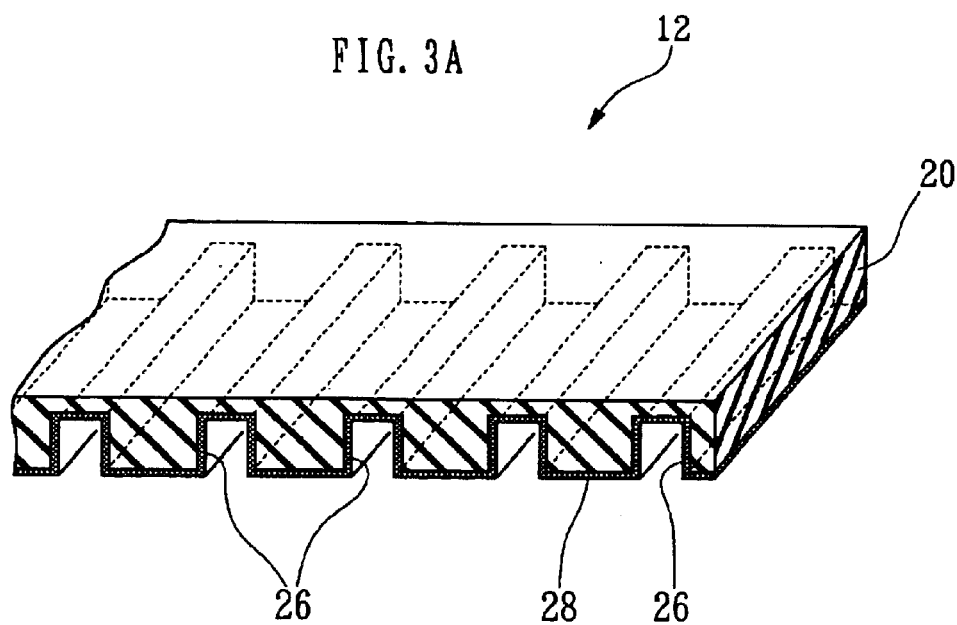
FIG. 3A is a partly cross-sectioned, perspective view showing another conveyor belt as a second embodiment of the present invention.
Figure 3B:
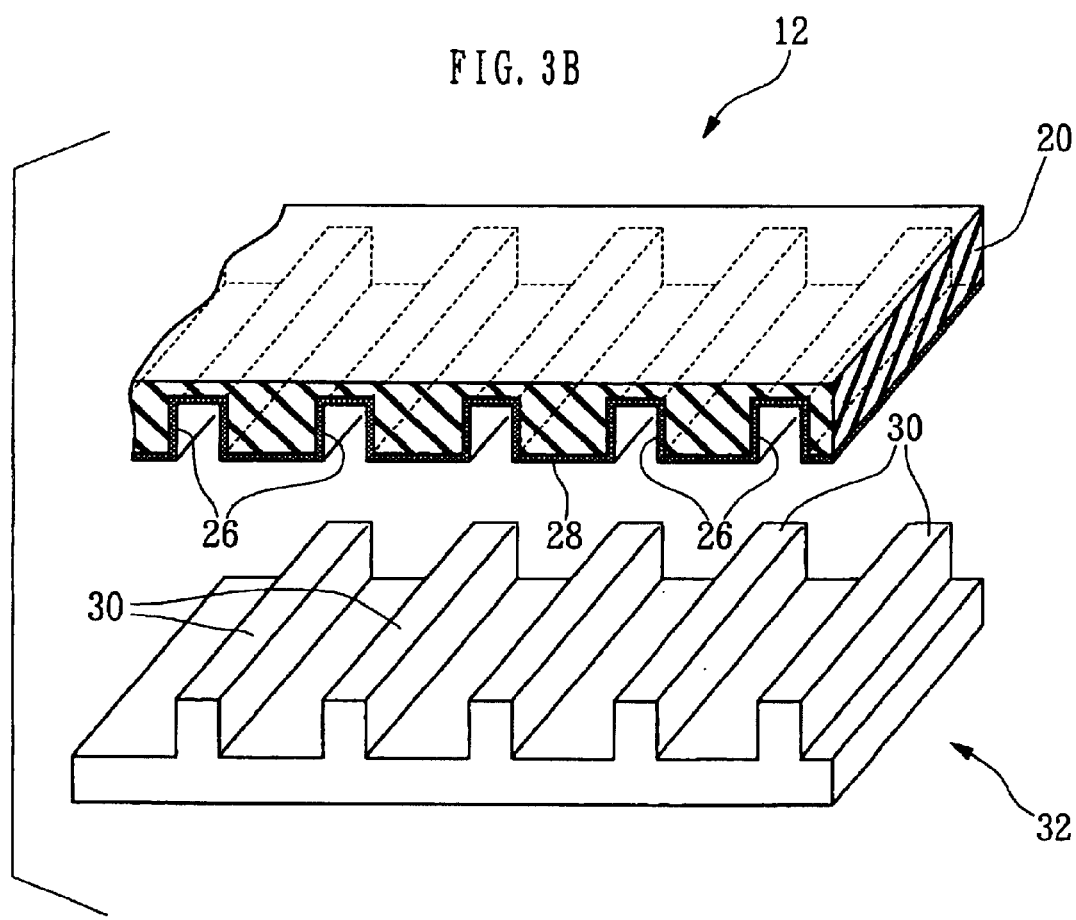
FIG. 3B is a perspective view for explaining a manner in which the conveyor belt of FIG. 3A is produced.

FIGS. 3A and 3B show another preferred embodiment of the present invention. This embodiment relates to a belt 12 including a rubber layer 20, and a tension canvas sheet 28 as a flexible belt-reinforcing material that is fixedly attached to a lower surface of the rubber layer 20 over an entire width of the same 20.

The rubber layer 20 has, in its lower surface, a plurality of recesses 26 which extend over the entire width of the layer 20 and are formed at a regular interval of distance in a lengthwise direction of the layer 20. The recesses 26 enhance a lengthwise stretchability of the rubber layer 20.

The tension canvas sheet 28 is fixedly attached to the lower surface of the rubber layer 20, along the recesses 26 of the lower surface, and, when the belt 12 is stretched in its lengthwise direction, the canvas sheet 28 is also stretched in its lengthwise direction because respective portions of the canvas sheet 28 that are bent along the recesses 26 are stretched.

Thus, the recesses 26 enhance the lengthwise stretchability of the belt 12, and the canvas sheet 28, repetitively bent in its lengthwise direction, assures the lengthwise stretchability of the belt 12.

The tension canvas sheet 28 is stretched out in its lengthwise direction, and accordingly cannot be stretched any longer, when the rubber layer 20 is stretched in its lengthwise direction by a certain amount.

Thus, the tension canvas sheet 28 also functions as a stopper which prevents the belt 12 from being stretched too much in its lengthwise direction.

As illustrated in FIG. 3B, this belt 12 can be easily produced using a metal mold 32 having a plurality of projections 30 at a regular interval of distance in its lengthwise direction.

This belt 12 has the full-width recesses 26 at the regular interval in its lengthwise direction, and additionally has the full-width canvas sheet 28. Thus, this belt 12 has a lengthwise stretchability over its entire width, and has a uniform stretchability in its lengthwise direction.

Therefore, this belt 12 can be preferably used as not only the curved-path conveyor belt but also the variable-speed conveyor belt.

FIGS. 4A, 4B and 4C show another preferred embodiment of the present invention. This embodiment relates to a belt 12 including an upper layer and a lower layer that are integrally formed with each other.

More specifically described, the belt 12 has, in a thicknesswise intermediate portion thereof, i.e., in an intermediate portion of a rubber layer 20, a plurality of voids 34 which have a circular cross section, which extend over an entire width of the layer 20, and which are formed at a regular interval of distance in a lengthwise direction of the layer 20. The voids 34 enhance a lengthwise stretchability of the belt 12.

Reinforcing threads (canvas threads) 36 as flexible belt-reinforcing members are embedded in the rubber layer 20, such that the reinforcing threads 36 are curved, like wave, along the voids 34.

Figure 5A:
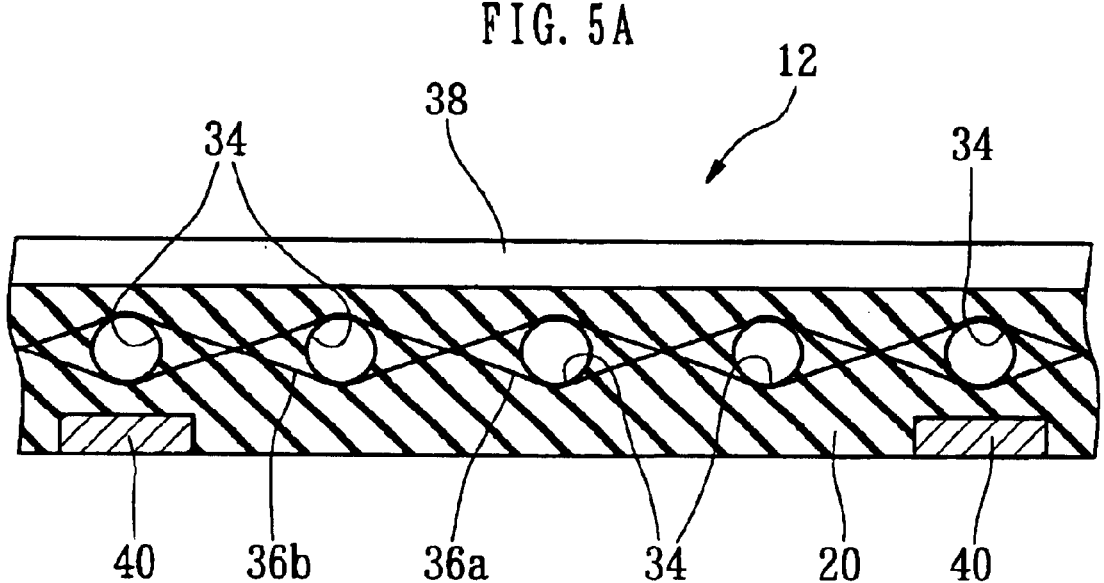
FIG. 5A is a longitudinal cross-sectional view of a portion of the conveyor belt of FIG. 4A.

More specifically described, the reinforcing threads 36 include a first group of reinforcing threads 36a, and a second group of reinforcing threads 36b having a phase opposite to that of the first group of threads 36a, and the first and second groups of threads 36a, 36b are embedded in the rubber layer 20, as shown in FIG. 5A, such that, around each of the voids 34 provided at the regular interval in the lengthwise direction, each group of threads are turned. Thus, the two groups of reinforcing threads 36a, 36b are repetitively curved in the lengthwise direction of the rubber layer 20.

Reference numerals 38 denote ridges which extend, on the upper surface of the belt 12, in the lengthwise direction of the belt 12. The ridges 38 are formed at a regular interval in the widthwise direction of the belt 12 over the entire width of the same 12.

Reference numerals 40 denote rigid plates which are embedded in the lower surface of the belt 12.

The voids 34 enhance the stretchability of the belt 12 over its entire width, and provide a lengthwise uniform stretchability of the belt 12. In addition, the shape of curving of the reinforcing threads 36 embedded in the rubber layer 20 assures the lengthwise stretchability of the belt 12.

The reinforcing threads 36 are stretched out in their lengthwise direction, and accordingly cannot be stretched any longer, when the rubber layer 20 is stretched in its lengthwise direction by a certain amount. Thus, the reinforcing threads 36 also function as a stopper which prevents the belt 12 from being excessively stretched in its lengthwise direction, or being damaged or broken because of the excessive stretching.

Thus, this belt 12 can be preferably used as not only the curved-path conveyor belt but also the variable-speed conveyor belt.

Figure 5B:
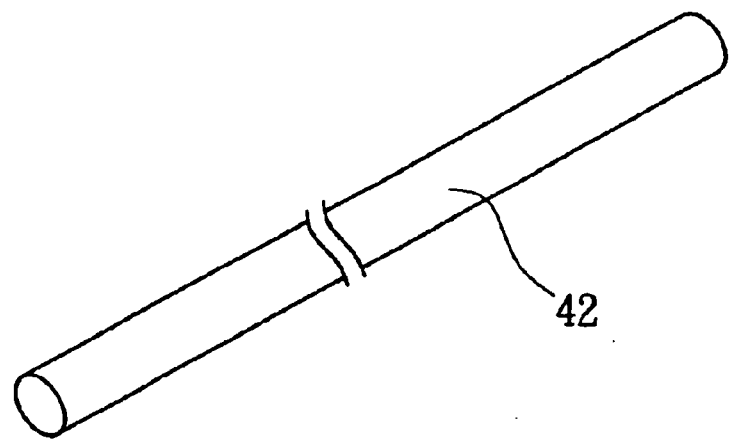
FIG. 5B is a perspective view of a round bar that is used to produce the conveyor belt of FIG. 4A.
Figure 6B:
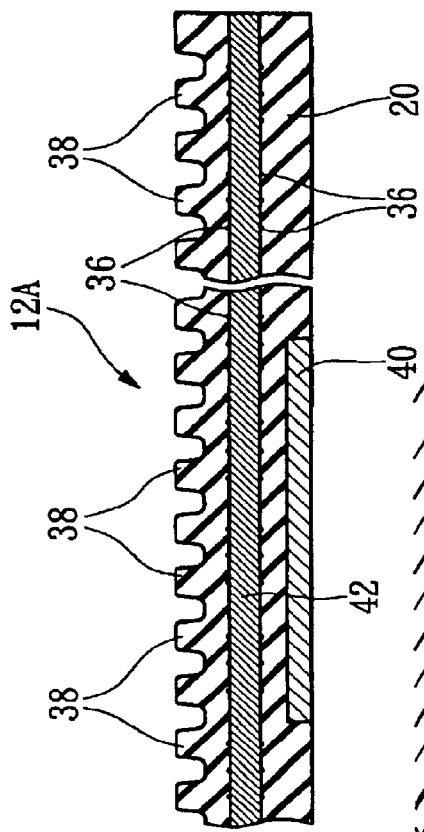
FIG. 6B is a transverse cross-sectional view for explaining the manner in which the conveyor belt of FIG. 4A is produced.
Figure 6A:
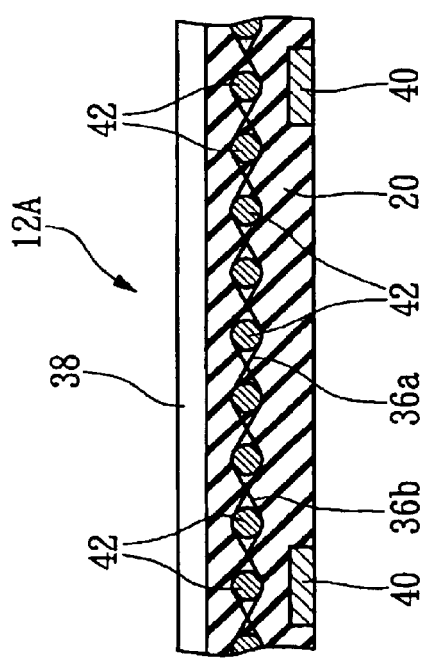
FIG. 6A is a longitudinal cross-sectional view for explaining a manner in which the conveyor belt of FIG. 4A is produced.
Figure 6C:
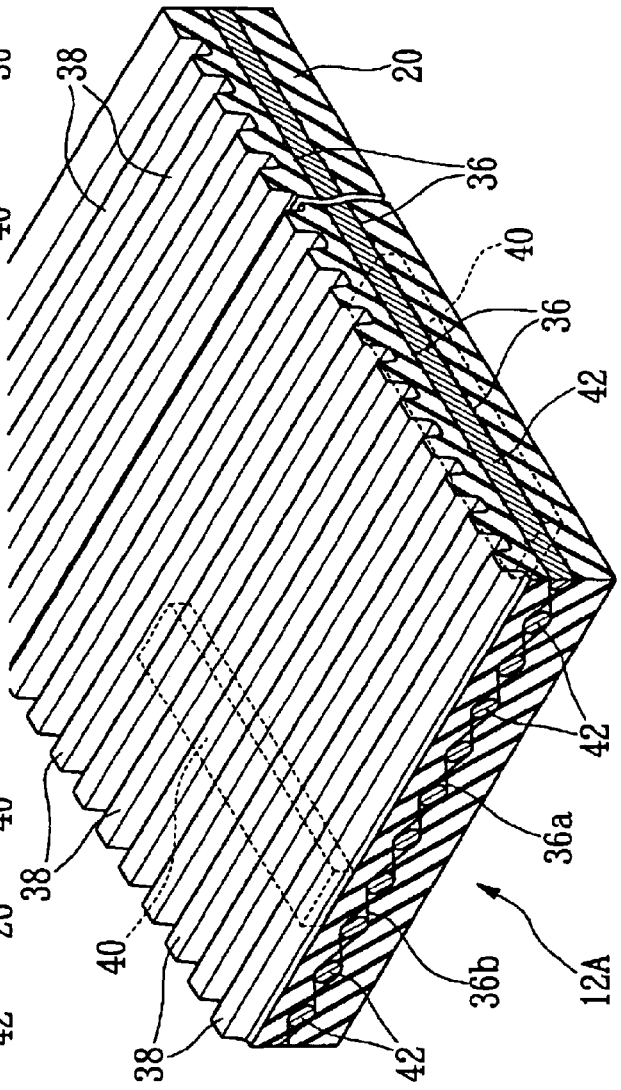
FIG. 6C is a partly cross-sectioned, perspective view for explaining the manner in which the conveyor belt of FIG. 4A is produced.

The belt 12 having the voids 34 in its thicknesswise intermediate portion can be easily produced, using round bars (bar members) 42, shown in FIG. 5B, that have a shape corresponding to that of the voids 34, as illustrated in FIGS. 6A, 6B, and 6C. More specifically described, first, the round bars 36 are arranged at a regular interval of distance, then the first and second groups of reinforcing threads 36a, 36b having the opposite phases are sequentially turned around each of the round bars 42, and subsequently a rubber layer 20 including upper and lower layers that sandwich the round bars 36 and the reinforcing threads 36 is integrally vulcanized. Thus, an initial belt 12A is obtained. Then, the round bars 42 are pulled out of the belt 12A, and a belt 12 as an end product is obtained.

Even a belt body in an unvulcanized state can be drawn into a vulcanizing step, using the reinforcing threads 36, without additionally employing a canvas sheet for the drawing operation. Thus, the belt 12 can be obtained in a continuous vulcanizing process.

Figure 7A:
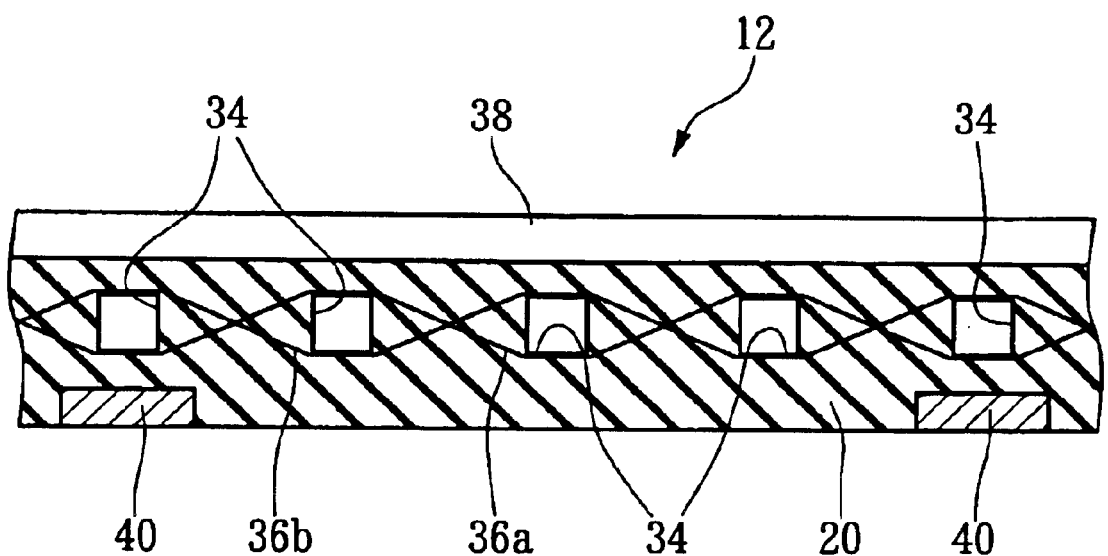
FIG. 7A is a longitudinal cross-sectional view showing another conveyor belt as a fourth embodiment of the present invention.
Figure 7B:
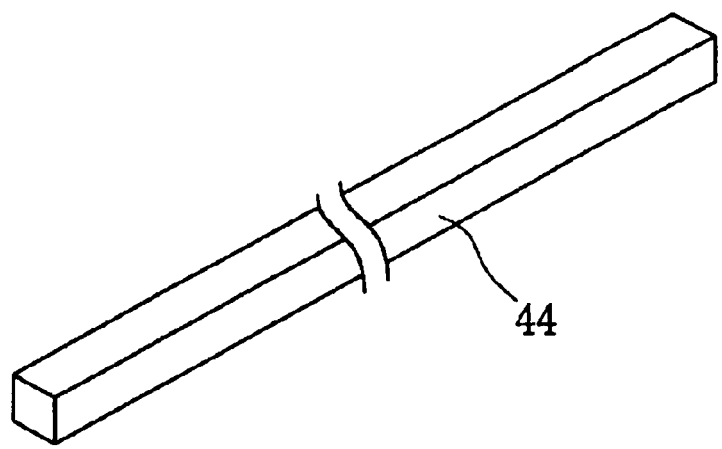
FIG. 7B is a perspective view of a rectangular bar that is used to produce the conveyor belt of FIG. 7A.
Figure 8A:
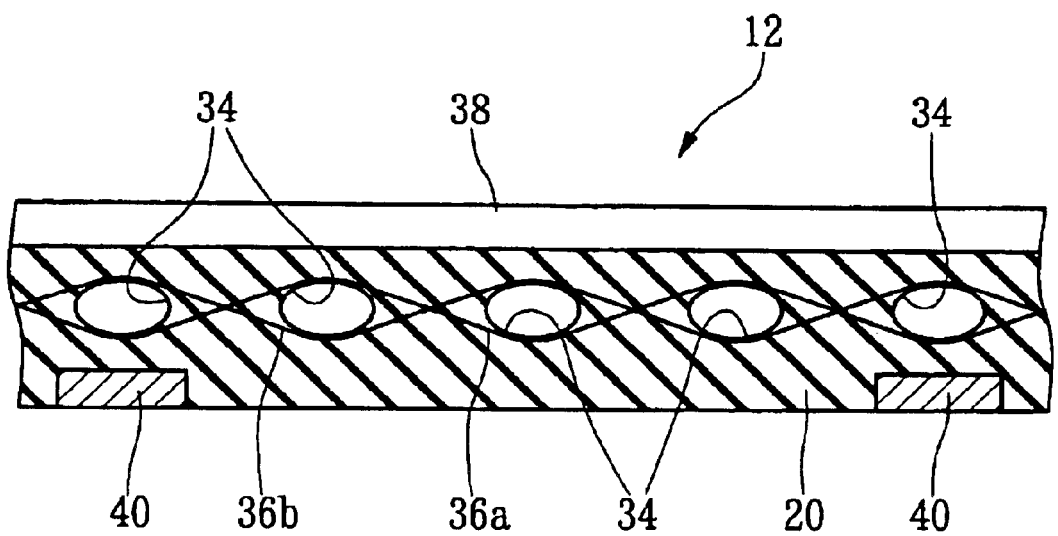
FIG. 8A is a longitudinal cross-sectional view showing another conveyor belt as a fifth embodiment of the present invention.
Figure 8B:
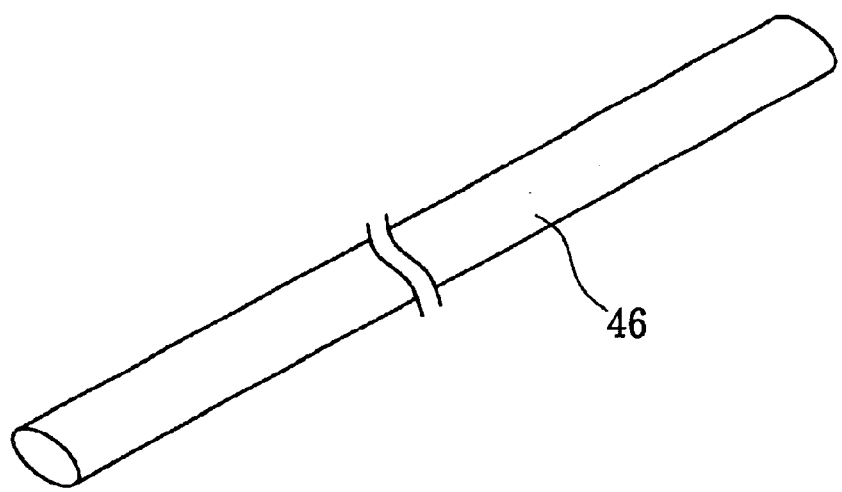
FIG. 8B is a perspective view of an elliptic bar that is used to produce the conveyor belt of FIG. 8A.

The voids 34 may be formed in other appropriate shapes. For example, as shown in FIGS. 7A and 7B, rectangular bars (bar members) 44 each having a rectangular cross section may be used to produce a belt 12 having voids 34 each having a rectangular cross section. Alternatively, as shown in FIGS. 8A and 8B, elliptic bars (bar members) 46 may be used to produce a belt 12 having voids 34 each having an elliptic cross section.

Figure 9A:
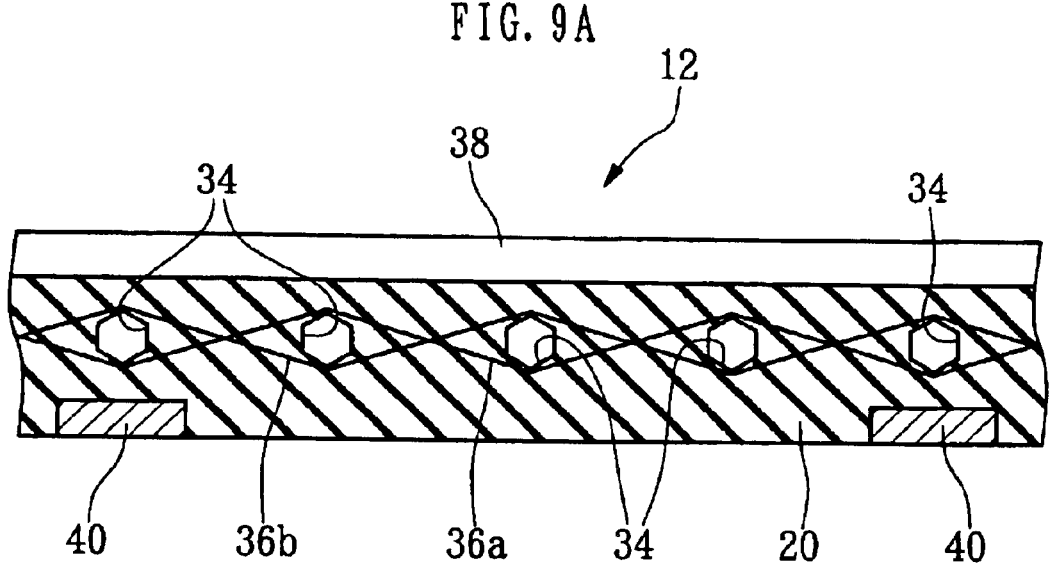
FIG. 9A is a longitudinal cross-sectional view showing another conveyor belt as a sixth embodiment of the present invention.
Figure 9B:
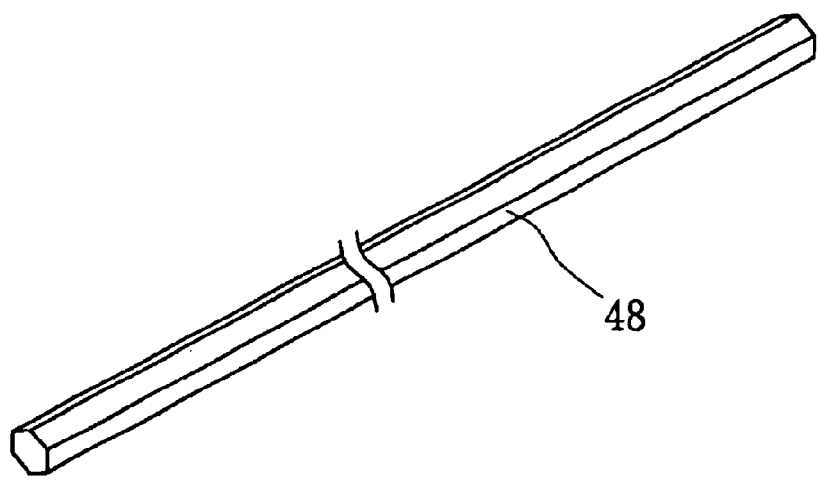
FIG. 9B is a perspective view of a hexagonal bar that is used to produce the conveyor belt of FIG. 9A.

Otherwise, as shown in FIGS. 9A and 9B, hexagonal bars (bar members) 48 may be used to produce a belt 12 having voids 34 each having a hexagonal cross section. Moreover, the voids 34 may be formed to have any appropriate polygonal cross-sectional shape or any appropriate non-polygonal cross-sectional shape.

FIGS. 10A and 10B show another preferred embodiment of the present invention.

This embodiment relates to a belt 12 including a rubber layer 20, and a tension canvas sheet 28 as a belt-reinforcing material that is embedded in the rubber layer 20 (i.e., a thicknesswise intermediate portion thereof). The tension canvas sheet 28 is repetitively curved, like wave, in a lengthwise direction of the rubber layer 20. The shape of curving of the canvas sheet 28 assures a lengthwise stretchability of the belt 12.

Figure 14A:
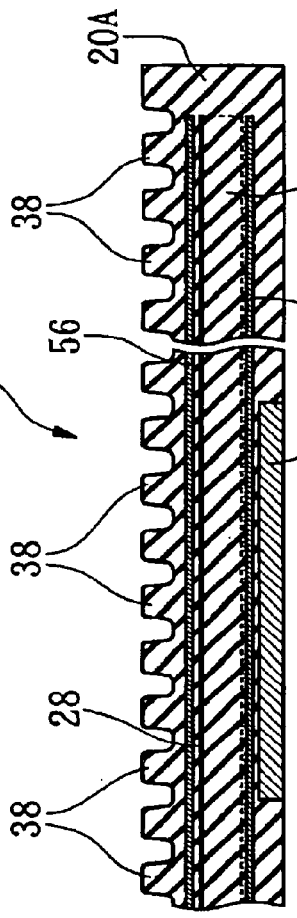
FIG. 14A is a longitudinal cross-sectional view showing another conveyor belt as an eleventh embodiment of the present invention.
Figure 14B:
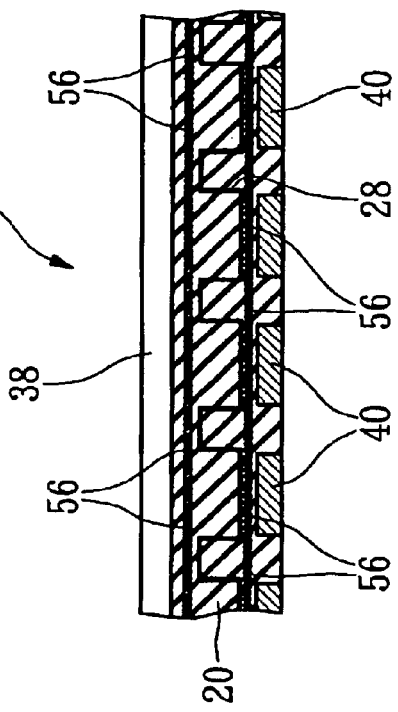
FIG. 14B is a transverse cross-sectional view of the conveyor belt of FIG. 14A.

The tension canvas sheet 28 is embedded in the rubber layer 20, such that the sheet 28 extends over the entire width of the belt 12, except for widthwise margin portions 20A of the rubber layer 20 (cf. FIG. 14B).

In this belt 12, too, the tension canvas sheet 28 is stretched out in its lengthwise direction, and accordingly cannot be stretched any longer, when the rubber layer 20 is stretched in its lengthwise direction by a certain amount. Thus, the canvas sheet 28 also functions as a stopper which prevents the belt 12 from being excessively stretched in its lengthwise direction.

This belt 12 can be produced in the following manner:

First, as shown in FIG. 10A, a mold 52 having a plurality of rounded projections 50 is used to vulcanize a lower layer 12-2 together with the canvas sheet 28. Then, as shown in FIG. 10B, an upper layer 12-1 is vulcanized with the lower layer 12-2 so as to be integrated with the same 12-2. Thus, the belt 12 can be easily produced.

Figure 11B:
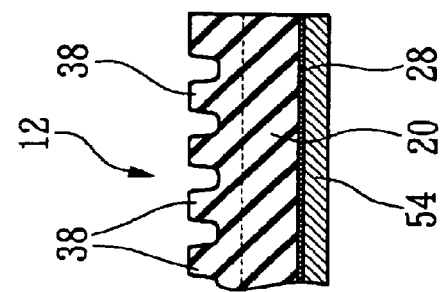
FIG. 11B is a transverse cross-sectional view of the conveyor belt of FIG. 11A.
Figure 11A:
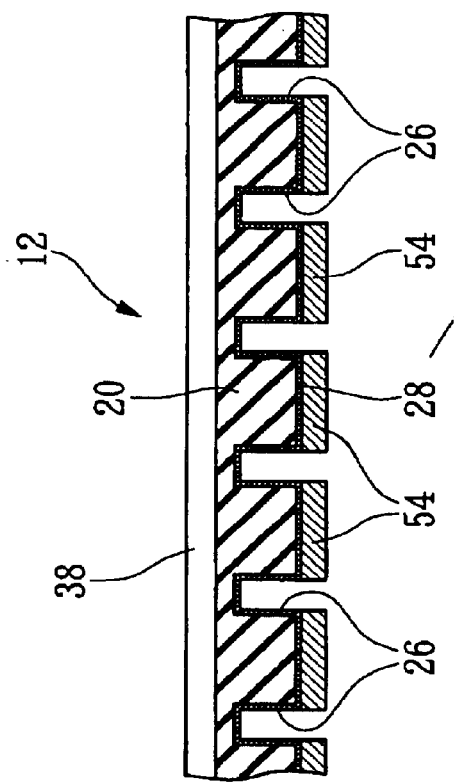
FIG. 11A is a longitudinal cross-sectional view showing another conveyor belt as an eighth embodiment of the present invention.
Figure 11C:
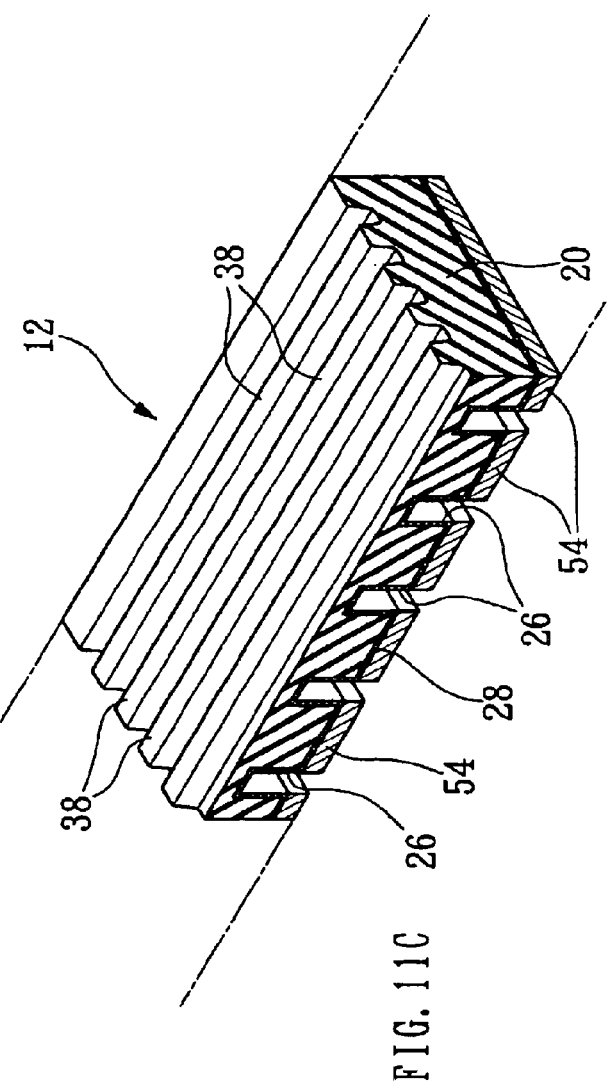
FIG. 11C is a partly cross-sectioned, perspective view of the conveyor belt of FIG. 11A.

FIGS. 11A, 11B, and 11C show another preferred embodiment of the present invention. This embodiment relates to a belt 12 which is basically similar to the belt shown FIGS. 3A and 3B and additionally includes a plurality of ridges 38 that are provided on an upper surface of the belt 12; and a plurality of transverse rigid plates 54, each as a transverse rigid member, that are formed of, e.g., metal or resin and are fixedly attached to a lower surface of the belt 12 such that the rigid plates 54 extend over an entire width of the belt 12 and are provided at a regular interval of distance in a lengthwise direction of the belt 12. The rigid plates 54 provide a transverse rigidity of the belt 12.

Thus, this belt 12 enjoys, in addition to the lengthwise stretchability, a transverse or widthwise rigidity owing to the transverse rigid plates 54.

The transverse rigid plates 54 extend over the entire width of the belt 12. Therefore, in the case where widthwise opposite end portions of the belt 12 are supported by rollers 70, described later, the rigid plates 54 can effectively prevent a widthwise central portion of the belt 12 from curving downward or sagging.

In addition, the rigid plates 54 can prevent the belt 12 from contracting in its widthwise direction.

The transverse rigid plates 54 may be provided on the lower surface of the belt shown in FIGS. 3A and 3B, or may be provided on the lower surface of each of the other belts shown in the other figures.

In the embodiment shown in FIG. 11A, the transverse rigid plates 54 are provided on the tension canvas sheet 28. However, as shown in FIGS. 12A and 12B, the transverse rigid plates 54 may be directly provided on the lower surface of the rubber layer 20, and the canvas sheet 28 may be provided on the rigid plates 54 such that the canvas sheet 28 fully covers the rigid plates 54.

In the modified embodiment shown in FIGS. 12A and 12B, the canvas sheet 28 can effectively prevent the rigid plates 54 from coming off the rubber layer 20 because of inappropriate vulcanization.

In the embodiment shown in FIG. 12A, the tension canvas sheet 28 extends over the entire width of the belt 12. However, as shown in FIGS. 13A and 13B, respective widthwise central portions of the transverse rigid plates 54 may be projected downward so as to remain exposed, and only respective widthwise opposite side portions of the rigid plates 54 may be covered with canvas sheets 28.

In the modified embodiment shown in FIG. 13A, a belt-driving member or members can be easily attached to the widthwise central portion of the lower surface of the belt 12.

Figure 14C:
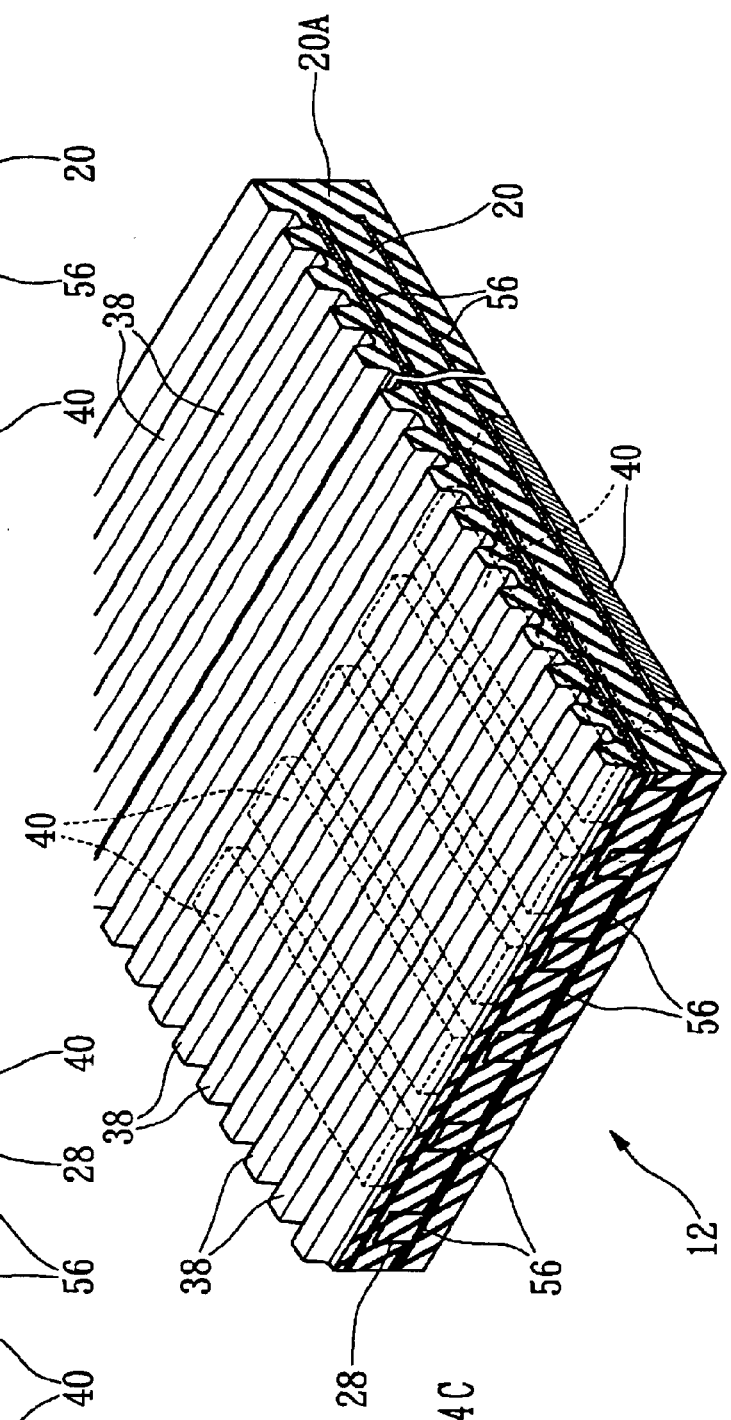
FIG. 14C is a partly cross-sectioned, perspective view of the conveyor belt of FIG. 14A.

FIGS. 14A, 14B, and 14C show another preferred embodiment of the present invention. This embodiment relates to a belt 12 including a plurality of wires (transverse rigid members) 56 which extend over a substantially entire width of the belt 12 except for margin rubbers 20A. The wires 56 are provided in the form of a layer which is substantially continuous (however, fine gaps may be left among the wires 56) in the lengthwise direction of the belt 12. Thus, the wires 56 provides a widthwise or transverse rigidity of the belt 12.

A number of wires 56 can be combined with one another, using rubber as a combining agent, so that the wires 56 are formed into a sheet or layer. The wire layer 56 is embedded in the rubber layer 20 of the belt 12.

In this way, the wires 56 in the form of the layer can be easily embedded in the belt 12.

This belt 12 has two wire layers 56 which are vertically spaced from each other by a predetermined distance. The two wire layers 56 can effectively improve the transverse rigidity of the belt 12, thereby increasing a load-supporting capability of the same 12.

The belt 12 additionally includes a tension canvas sheet 28 which is embedded in the rubber layer 20 such that the canvas sheet 28 is repetitively bent in the lengthwise direction of the belt 12, like the canvas sheet 28 employed in the embodiment shown in FIG. 3A.

Figure 15:
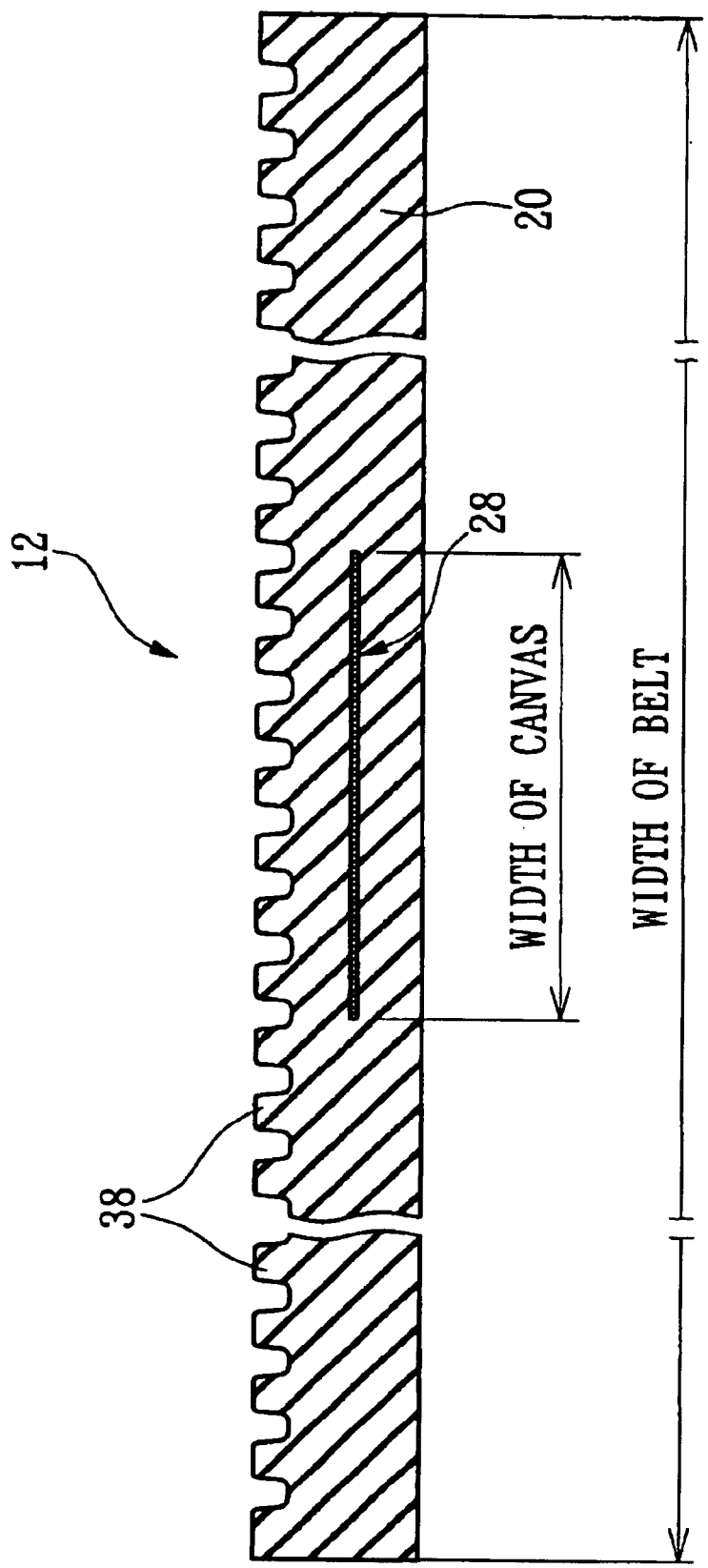
FIG. 15 is a transverse cross-sectional view showing another conveyor belt as a twelfth embodiment of the present invention.

FIG. 15 shows another preferred embodiment of the present invention. The present embodiment relates to a belt 12 including, in only a thicknesswise intermediate and widthwise central portion of a rubber layer 20, a tension canvas sheet 28 that is extended out in a lengthwise direction of the belt 12, i.e., has no curved or bent portions in that direction. Thus, the belt 12 has no canvas sheet 28 in widthwise opposite side portions thereof, and accordingly the widthwise opposite side portions of the belt 12 are provided by respective portions of the rubber layer 20.

Therefore, this belt 12 has substantially no lengthwise stretchability in its widthwise central portion, and has, owing to an elasticity of the rubber layer 20, a lengthwise stretchability in its widthwise opposite side portions only.

Thus, this belt 12 can be preferably used as the curved-path conveyor belt.

FIG. 16 shows another preferred embodiment of the present invention. The present embodiment relates to a belt 12 including an upper layer and a lower layer that are integrally formed with each other to provide a rubber layer 20; and a plurality of voids 34 which are provided in the rubber layer 20 (i.e., in a thicknesswise intermediate portion of the layer 20) and each of which is gradually widened in respective directions from a widthwise central portion of the belt 12 toward widthwise opposite end portions of the same 12.

Since each of the voids 34 is gradually widened in the directions toward the widthwise opposite end portions of the belt 12, the shape of the voids 34 increases a lengthwise stretchability of the belt 12 in the directions toward the widthwise opposite end portions of the belt 12. Thus, widthwise opposite side portions of the belt 12 have a higher lengthwise stretchability than a widthwise central portion of the same 12.

This belt 12 is preferably used as the curved-path conveyor belt. However, since the belt 12 has a certain degree of lengthwise stretchability in its widthwise central portion, the belt 12 can be used as the variable-speed conveyor belt.

In addition, a radius of curvature of the belt 12 can be reduced. That is, the belt 12 can be moved along an acutely curved portion of the loop path.

Figure 17A:
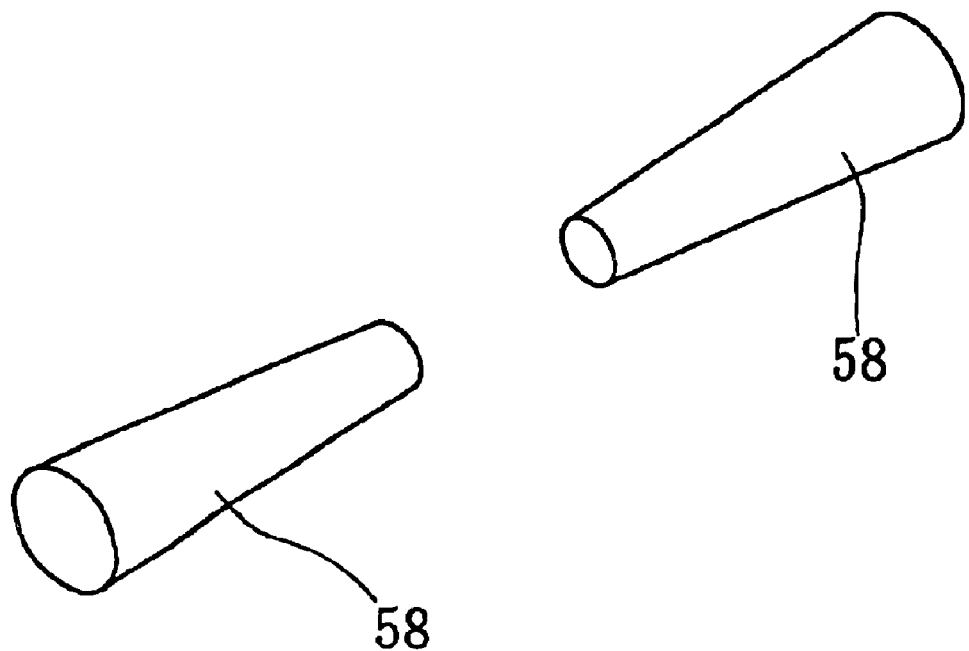
FIG. 17A is a perspective view of a pair of bar members that are used to produce the conveyor belt of FIG. 16A.
Figure 17B:
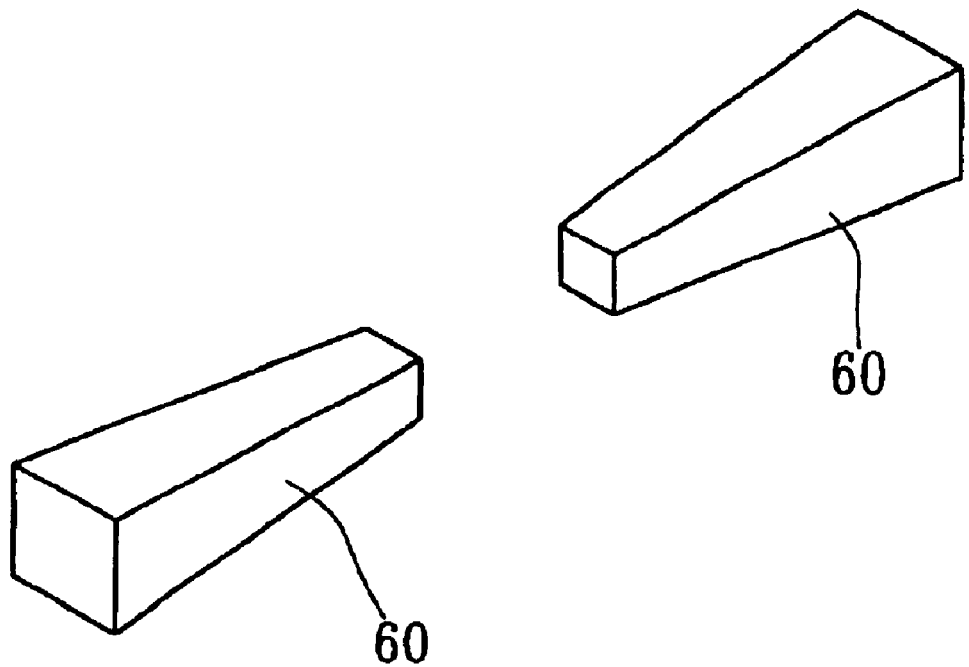
FIG. 17B is a perspective view of another pair of bar members that are used to produce a modified form of the conveyor belt of FIG. 16A.

When the voids 34 of the belt 12 shown in FIG. 16A are formed, round tapered bars 58 shown in FIG. 17A or rectangular tapered bars 60 shown in FIG. 17B are used. More specifically described, first, the belt 12 is integrally formed with the tapered bars 58, 60 embedded therein, and then those bars 58, 60 are pulled out of the belt 12. Thus, the belt 12 having the voids 34 can be easily produced.

Figure 18:
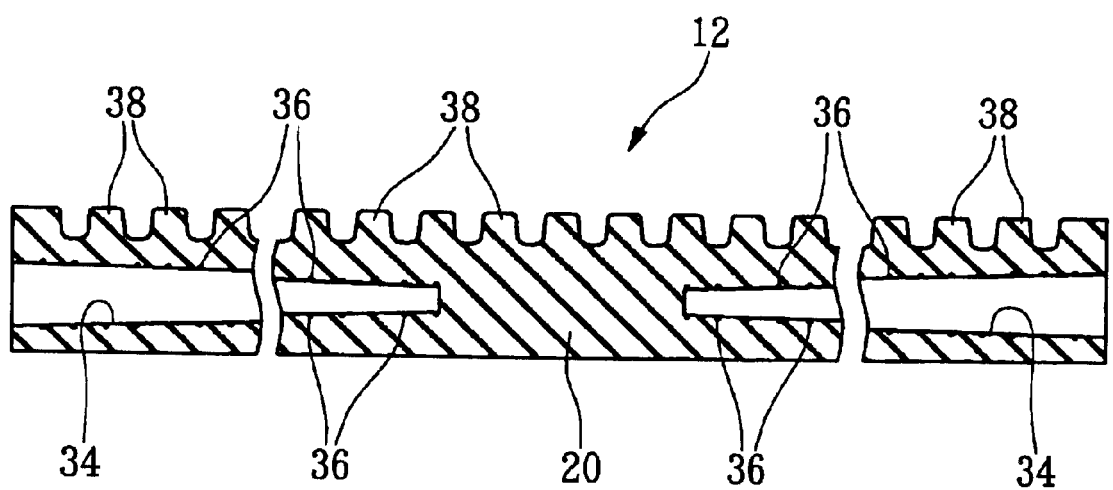
FIG. 18 is a transverse cross-sectional view showing another conveyor belt as a fourteenth embodiment of the present invention.

FIG. 18 shows a modified form of the embodiment shown in FIG. 16A. This modified embodiment relates to a belt 12 that does not have voids 34 in its widthwise central portion, i.e., has voids in its widthwise opposite side portions only.

This belt 12 has a higher lengthwise stretchability in its widthwise opposite side portions than that in its widthwise central portion.

Figure 19:
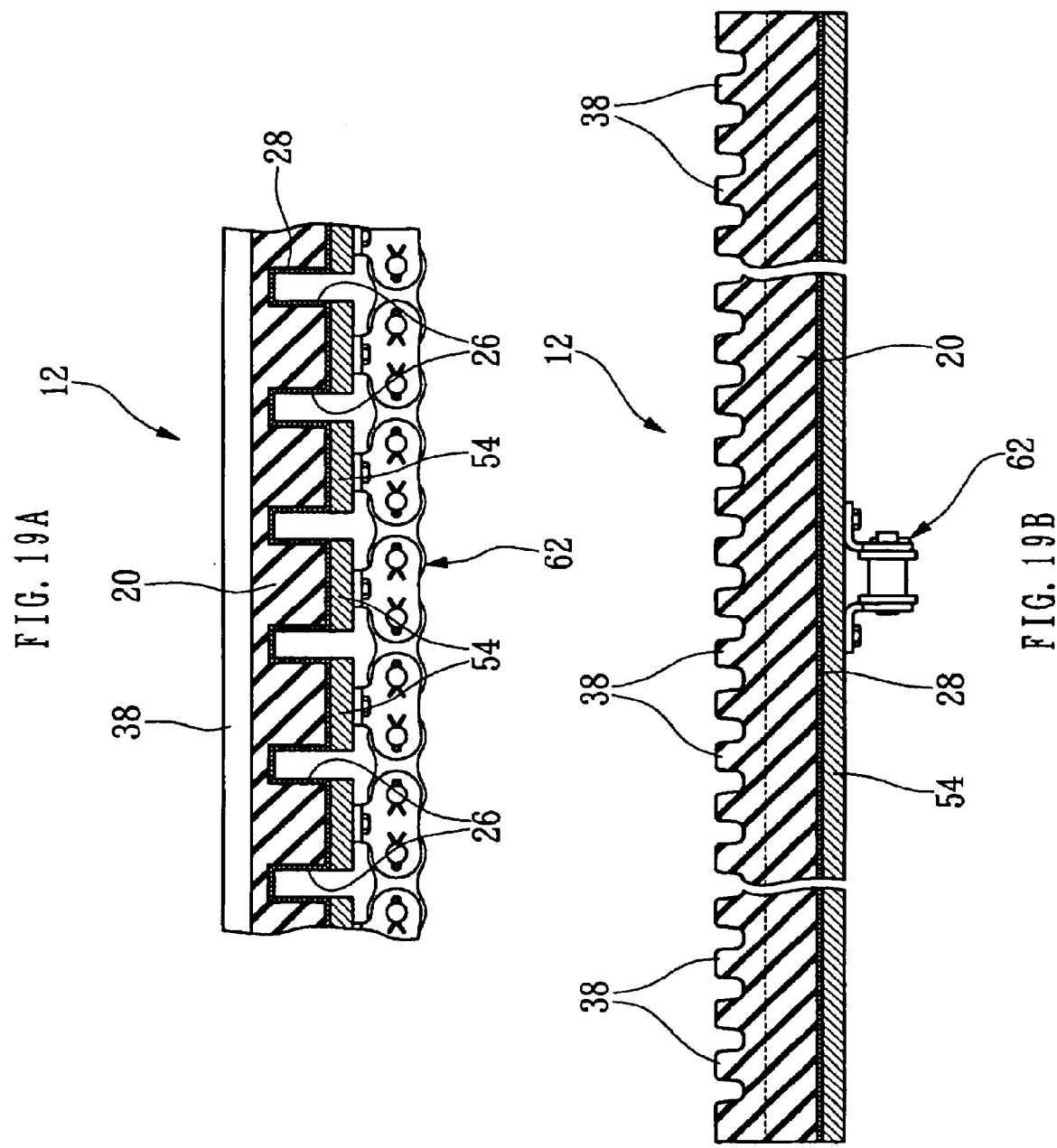
FIG. 19A is a longitudinal cross-sectional view showing another conveyor belt as a fifteenth embodiment of the present invention.
FIG. 19B is a transverse cross-sectional view of the conveyor belt of FIG. 19A.

FIG. 19 shows another embodiment of the present invention.

The present embodiment relates to a belt 12 which has, in its back surface, transverse rigid plates 54, like the belt shown in FIG. 11, and which is provided with a chain 62 as part of a drive member to drive the belt 12, such that the chain 62 is fixed to the back surface of the rigid plates 54 in a continuous fashion in the lengthwise direction of the belt 12.

In the present embodiment, the chain 62 functions as a belt-reinforcing material that binds the widthwise central portion of the belt 12, such that the widthwise central portion is not stretchable in the lengthwise direction. Thus, in this embodiment, only the widthwise opposite side portions have a lengthwise stretchability.

Therefore, the belt 12 can be preferably used as the curved-path conveyor belt.

The chain 62 may be fixed to the back surface of the transverse rigid plates 54 provided in the back surface of the belt 12 shown in FIG. 3. However, the chain 62 may be provided on the back surface of each of the other belts 12 shown in the other figures.

Figure 20:
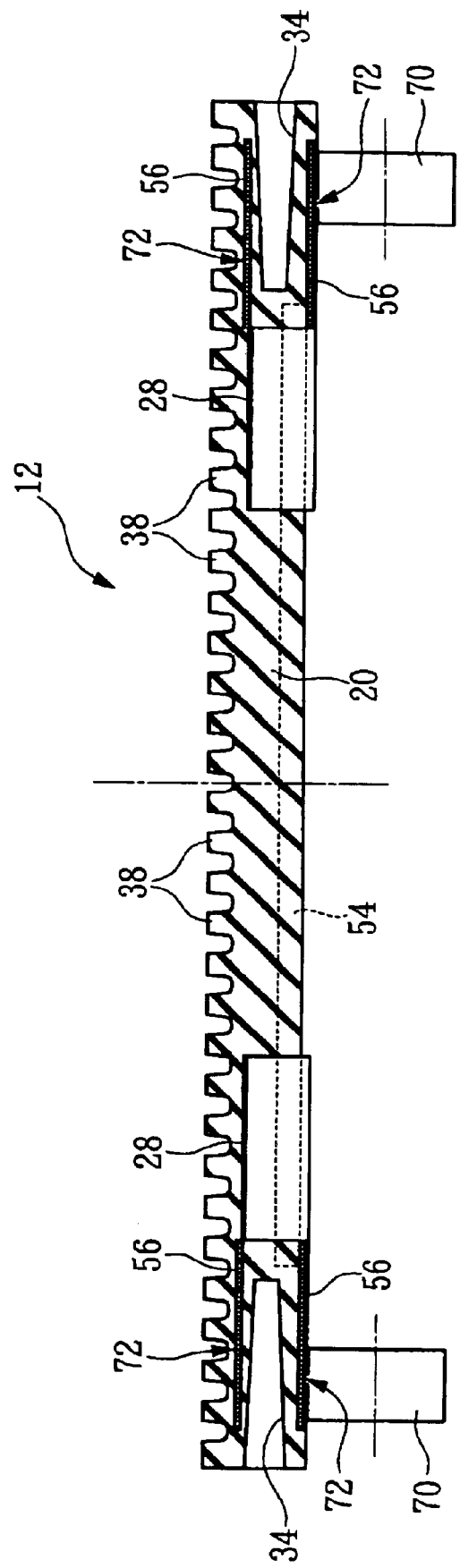
FIG. 20 is a transverse cross-sectional view showing another conveyor belt as a sixteenth embodiment of the present invention.
Figure 21A:
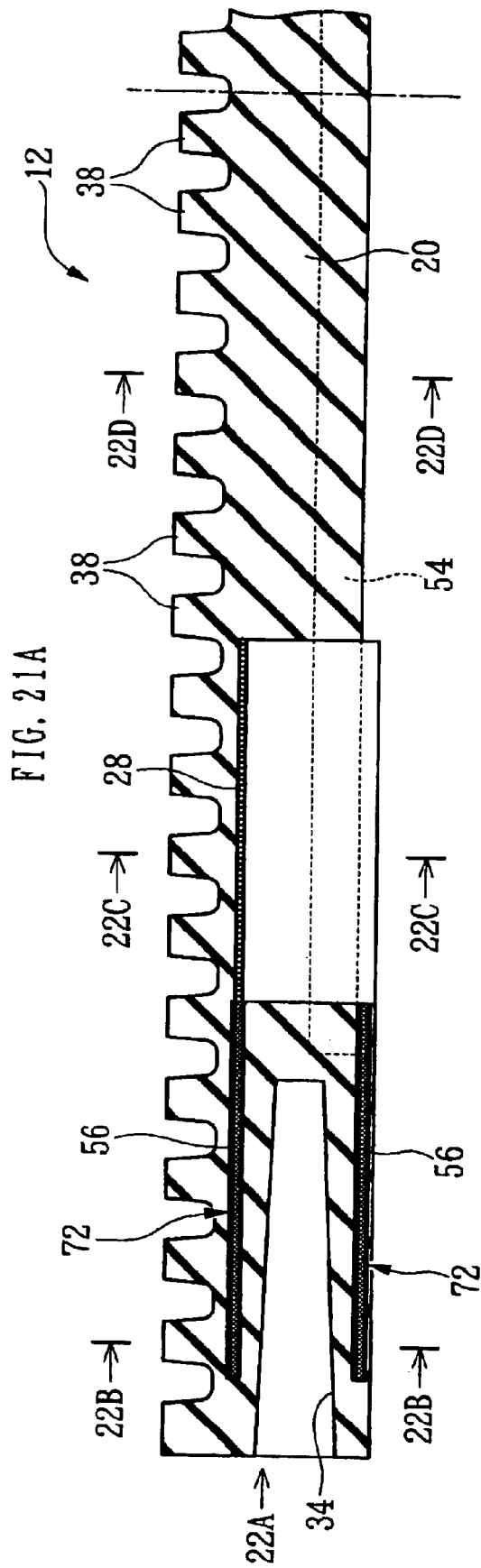
FIG. 21A is an enlarged, transverse cross-sectional view of a portion of the conveyor belt of FIG. 20.
Figure 21B:
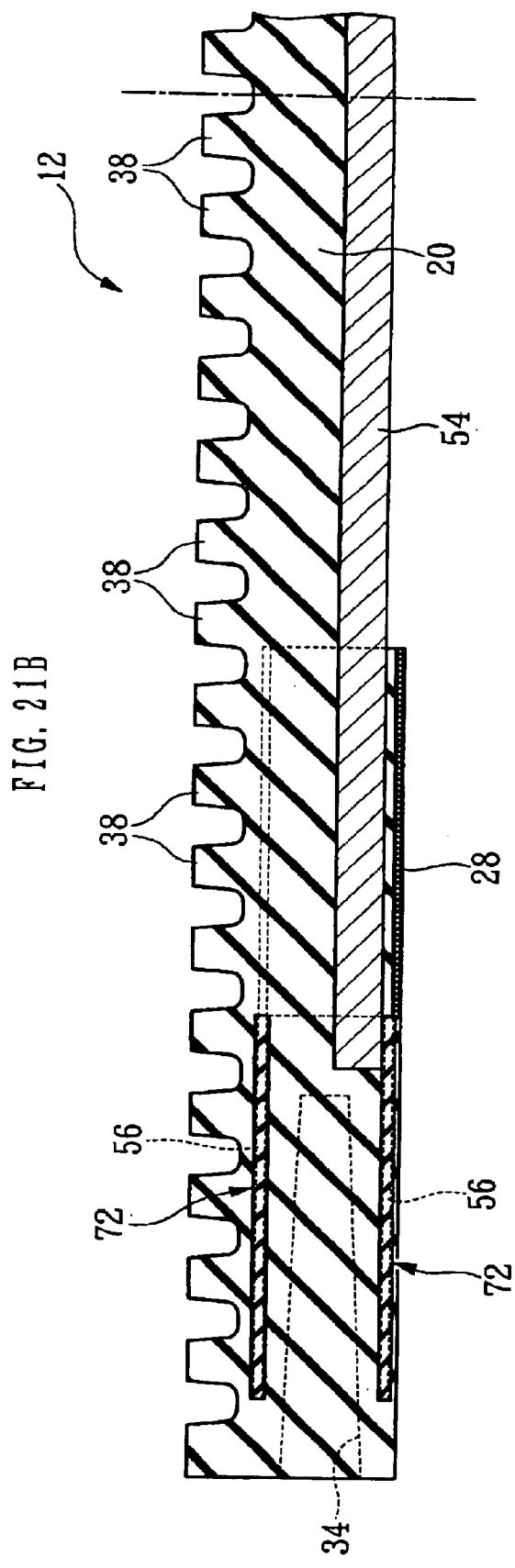
FIG. 21B is an enlarged, transverse cross-sectional view of another portion of the conveyor belt of FIG. 20.
Figure 22A:
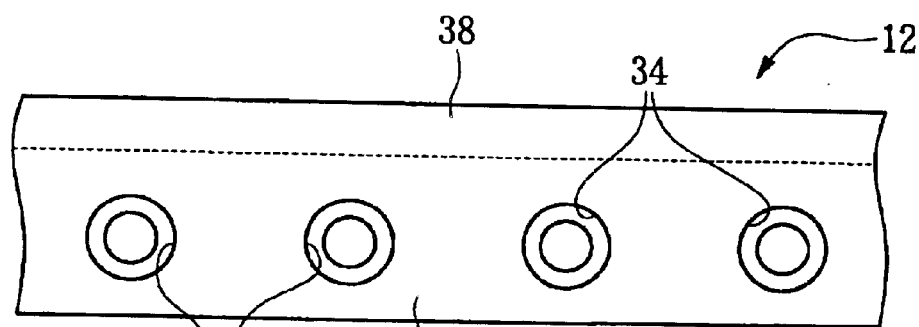
FIG. 22A is an enlarged, side elevation view of the conveyor belt of FIG. 20.
Figure 22B:
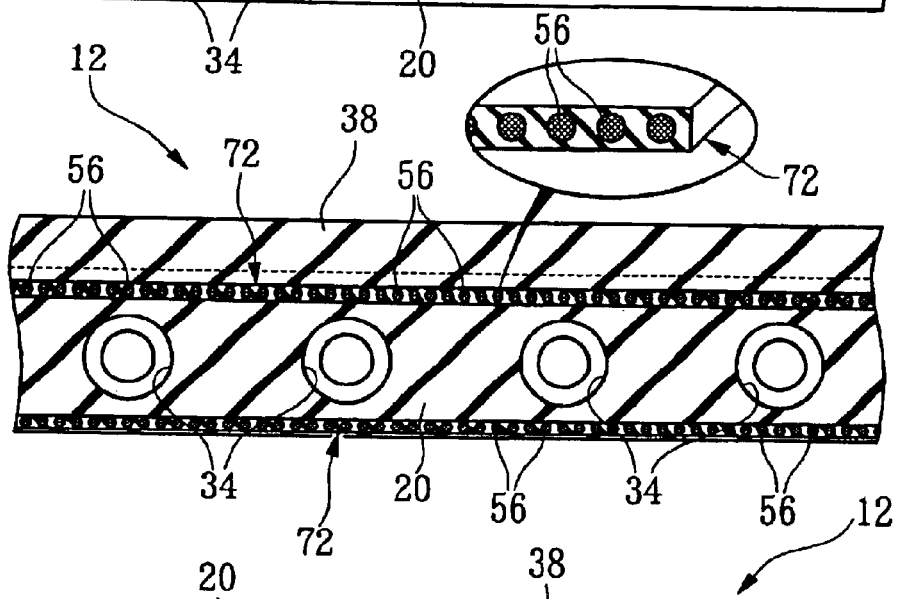
FIG. 22B is an enlarged, longitudinal cross-sectional view of a first portion of the conveyor belt of FIG. 20.

FIGS. 20, 21A, 21B, 22A, 22B, 22C, 22D, and 23 show another preferred embodiment of the present invention. The present embodiment relates to a belt 12 having two arrays of tapered voids 34 in its widthwise opposite end portions, respectively, that are supported by rollers 70, respectively. The two arrays of tapered voids 34 are provided in a thicknesswise intermediate portion of the belt 12, such that each of one array of tapered voids 34 is widened in a direction toward a corresponding one of widthwise opposite ends of the belt 12 and each of the other array of tapered voids 34 is widened in a direction toward the other widthwise end of the same 12. In addition, the belt 12 includes, on upper and lower sides of each array of tapered voids 34, a plurality of wires 56 which extend in the widthwise direction of the belt 12 and which provide a transverse or widthwise rigidity of the same 12. As shown in FIG. 22B, in each of the widthwise opposite end portions of the belt 12, the wires 56 are provided in the form of two layers that extend in the lengthwise direction of the belt 12, such that, in each layer, the wires 56 are substantially continuous with each other (in fact, fine gaps are left among the wires 56).

As shown in FIG. 22B, a number of wires 56 are combined into a wire sheet 72, using rubber as a combining agent. Two wire sheets 72 and a rubber layer 20 are superposed on one another, and the belt 12 integrally including the wire sheets 72 is formed.

In addition, the belt 12 includes a number of transverse rigid plates 54 that are provided, on a lower surface of the belt 12, between the widthwise opposite end portions of the belt 12, and extend in the widthwise direction of the belt 12 such that the transverse rigid plates 54 partly overlap respective end portions of the wires 56 in each of the widthwise opposite end portions.

The transverse rigid plates 54 are provided at a regular interval of distance in the lengthwise direction of the belt 12.

Figure 22C:
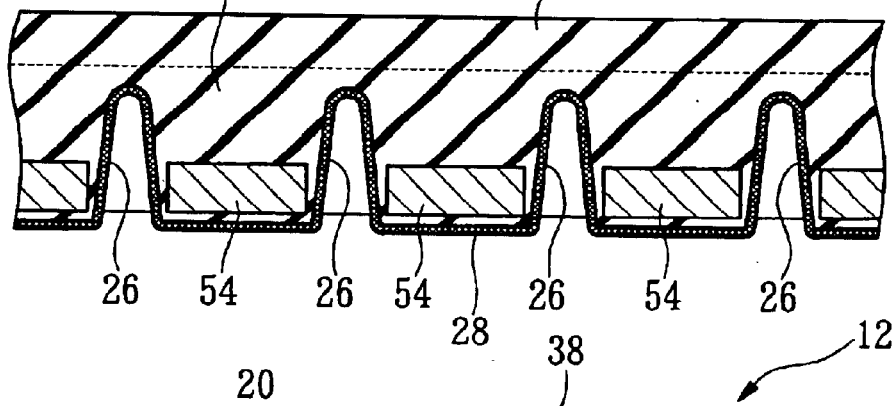
FIG. 22C is an enlarged, longitudinal cross-sectional view of a second portion of the conveyor belt of FIG. 20.
Figure 22D:
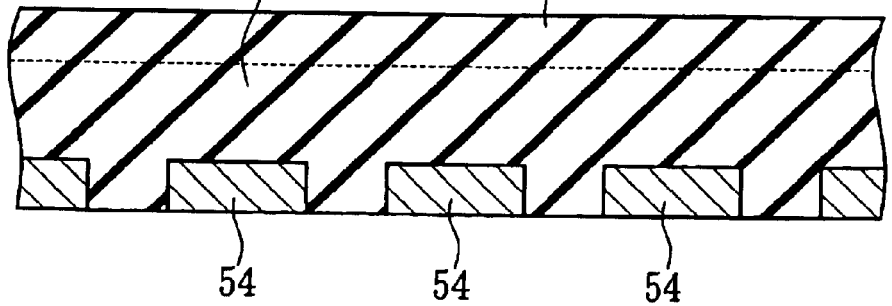
FIG. 22D is an enlarged, longitudinal cross-sectional view of a third portion of the conveyor belt of FIG. 20.

As shown in FIGS. 20, 21A, and 22C, the belt 12 has, on a widthwise inner side of each array of tapered voids 34 (i.e., at a position nearer than the each array of voids 34 to the widthwise central portion of the tape 12), an array of recesses 26 which are formed in a lower surface of a predetermined widthwise portion of the belt 12, and which are provided at a regular interval of distance in the lengthwise direction of the belt 12. Moreover, the belt 12 includes two tension canvas sheets 28 that are provided in the respective predetermined widthwise portions of the belt 12, in which the two arrays of recesses 26 are formed, and that cover the lower surfaces of the predetermined widthwise portions and the respective inner surfaces of those recesses 26. Thus, each of the two tension canvas sheets 28 is iteratively curved and bent in the lengthwise direction of the belt 12.

Thus, as shown in the figures, the widthwise central portion of the belt 12 that is located between the left-hand array of recesses 26 and canvas sheet 28 and the right-hand array of recesses 26 and canvas sheet 28, is basically provided by the rubber layer 20 only, except for the transverse rigid plates 54.

This belt 12 does not have, in the respective lower surfaces of the widthwise opposite end portions of the belt 12 that are supported by the rollers 70, lower cuts 24b or recesses 26, and has the voids 34 in the thicknesswise intermediate portion of the belt 12 and additionally has the wire layers 56 below the voids 34. Thus, the belt 12 not only enjoys the improved lengthwise stretchability of the widthwise opposite end portions thereof but also prevents the widthwise opposite end portions from producing large vertical vibrations or impacts when the belt 12 runs over the rollers 70. Thus, the belt 12 can be smoothly moved over the rollers 70.

In addition, since the wires 56 in the form of layers are provided below the voids 34, the rollers 70 can effectively support, in spite of the voids 34, the widthwise opposite end portions of the belt 12, thereby improving the load supporting capability of the same 12.

Moreover, the belt 12 has, in the respective lower surfaces of the respective portions of the belt 12 that are widthwise nearer to the central portion of the belt 12 than the voids 34, the recesses 26 that extend in the widthwise direction of the belt 12 and are provided at a regular interval of distance in the lengthwise direction of the belt 12. Thus, the stretchability of widthwise opposite side portions of the belt 12 is further enhanced.

In addition, the widthwise central portion of the belt 12 is basically provided by the rubber layer 20 only, except for the transverse rigid plates 54, and accordingly the central portion of the belt 12 can be stretched in the lengthwise direction thereof owing to the elasticity of the rubber.

The stretchability of the widthwise central portion of the belt 12 can enhance the stretchability or contractibility of the widthwise end portions of the belt 12. Therefore, even in the case where the loop path is considerably sharply curved, the belt 12 can adequately follow the loop.

FIGS. 24A and 24B show another preferred embodiment of the present invention.

This embodiment relates to a belt 12 which has, in its thicknesswise intermediate portion, a plurality of voids 34 that extend in a widthwise direction of the belt 12 and are provided at a regular interval of distance in a lengthwise direction of the belt 12.

The voids 34 may be formed through the belt 12 in its widthwise direction, i.e., respective widthwise opposite ends of the voids 34 may be open. Alternatively, the widthwise opposite ends of the voids 34 may be closed.

In addition, the belt 12 has, in its thicknesswise intermediate portion, a plurality of pairs of transverse rigid plates 54 that extend in the widthwise direction of the belt 12 and are provided at a regular interval of distance in the lengthwise direction of the belt 12 such that the pairs of rigid plates 54 are alternate with the voids 34 and each pair of rigid plates 54 are partly exposed to the two voids 34 adjacent thereto. The two rigid plates 54 of each pair are superposed on each other.

Figure 25:
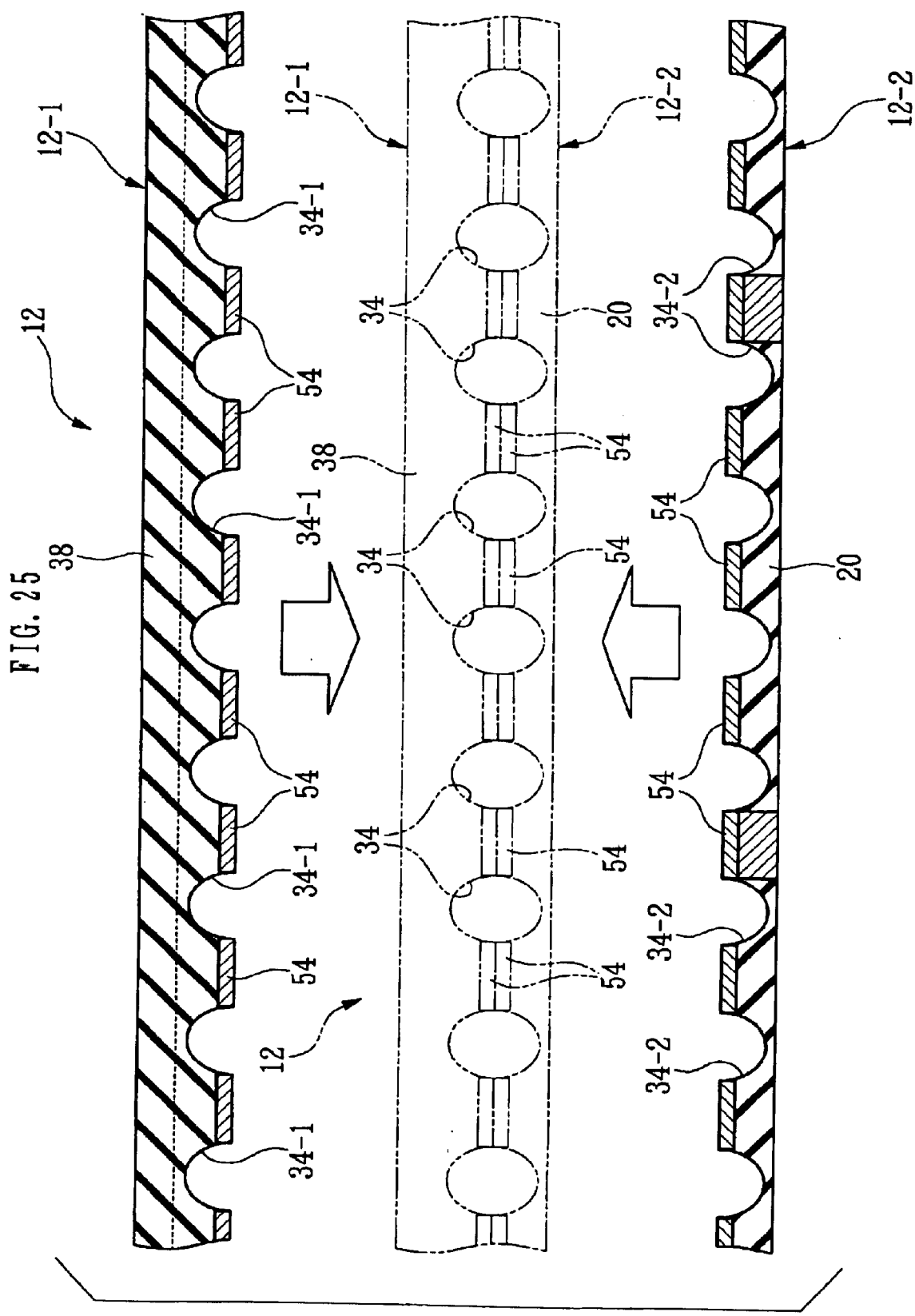
FIG. 25 is a view for explaining a manner in which the conveyor belt of FIG. 24A is produced.
Figure 26A:
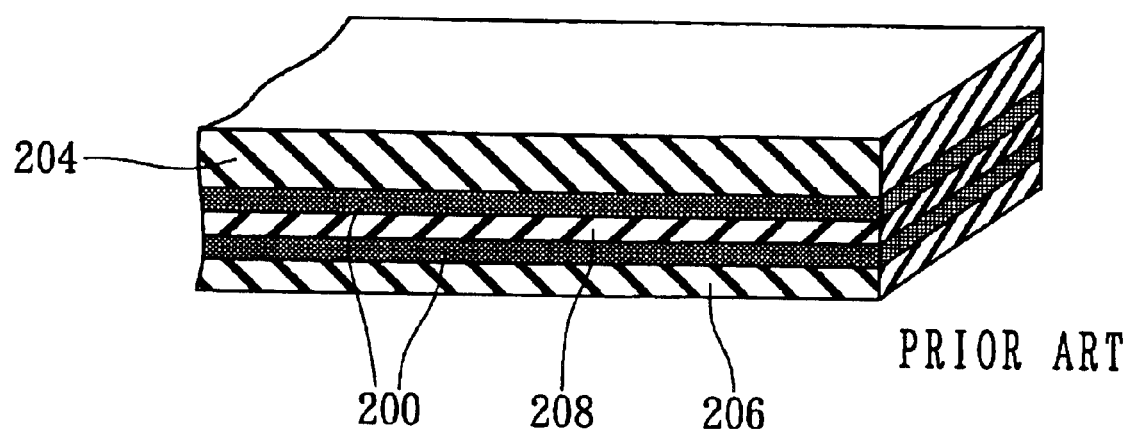
FIG. 26A is a partly cross-sectioned, perspective view of a conventional conveyor belt.
Figure 26B:
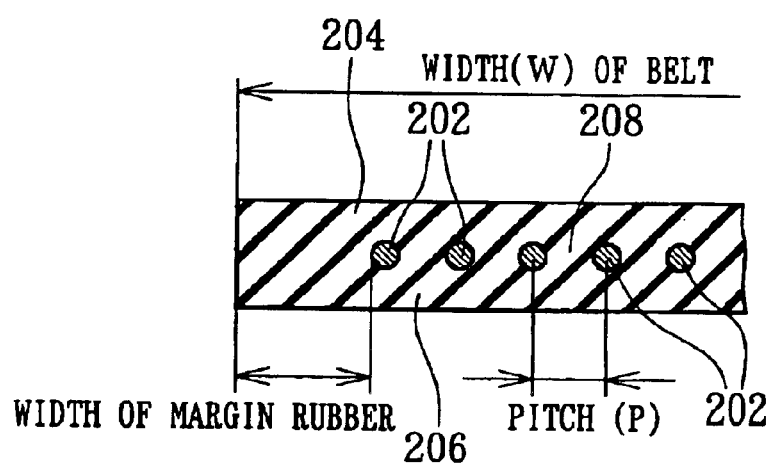
FIG. 26B is a transverse cross-sectional view of a portion of the conventional conveyor belt of FIG. 26A.

This belt 12 is produced in a method illustrated in FIGS. 25A, 25B, and 25C. First, an upper layer 12-1 including upper transverse rigid plates 54, and a lower layer 12-2 including lower transverse rigid plates 54 are formed separately from each other, and then the upper and lower layers 12-1, 12-2 are fixed to each other such that the upper rigid plates (metal members) 54 are superposed on the lower rigid plates (metal members) 54, respectively. Thus, the integral belt 12 is produced.

Each of the upper layer 12-1 and the lower layer 12-2 is integrally formed over its entire width.

The upper layer 12-1 has, in its lower surface, respective upper half portions 34-1 of a plurality of voids 34 each having a vertically elongate, elliptic cross section; and the lower layer 12-2 has, in its upper surface, respective lower half portions 34-2 of the voids 34. The upper and lower layers 12-1, 12-2 are superposed on, and fixed to, each other to provide the integral belt 12 having, in its thicknesswise intermediate portion, the elliptic voids 34.

The upper and lower layers 12-1, 12-2 are fixed to each other in various manners. For example, respective exposed, widthwise opposite ends of each pair of upper and lower transverse rigid plates 54 that are metallic members are welded to each other. Alternatively, each pair of upper and lower transverse rigid plates 54 are fixed, with an adhesive, to each other. Otherwise, as shown in an enlarged view of a portion of the belt 12, included in FIG. 24A, holes 74 are formed by removing respective small portions of the rubber layer 20 of the lower layer 12-2, and each pair of upper and lower transverse rigid plates 54 are fastened to each other with a bolt 76.

According to this method, the belt 12 having the voids 34 in its thicknesswise intermediate portion can be easily produced.

This belt 12 does not have unevenness in the respective lower surfaces of its widthwise opposite end portions. Therefore, in the case where the widthwise opposite end portions of the belt 12 are supported on the rollers 70 shown in FIG. 20, the belt 12 can smoothly run on the rollers 70.

While the present invention has been described in its preferred embodiments, the present invention may otherwise be embodied.

For example, it is possible to produce a belt 12 including a canvas sheet that is woven by using transverse rigid members such as wires. In addition, the principle of the present invention is applicable to other conveyor belts than the pedestrian or person conveyor belt. That is, it is to be understood that the present invention may be embodied with other changes that may occur to a person skilled in the art without departing from the spirit and scope of the invention defined in the appended claims.

What is claimed is:

1. A stretchable conveyor belt comprising:

an intermediate portion having a thickness portion, a width extending normal to a lengthwise direction of the belt and having widthwise opposite ends, and at least one void in said thickness portion, each said at least one void gradually widening in at least one direction toward at least one of the widthwise opposite ends wherein each said at least one void is for imparting elasticity to the belt.

2. A stretchable conveyor belt comprising:

widthwise portions extending normal to a lengthwise direction length of the belt, each said widthwise portion comprising an intermediate portion having a thickness portion and at least one void in said thickness portion and located at a regular interval of distance in the lengthwise direction of the belt, wherein said at least one void provides elasticity to the belt; and at least one pair of first and second flexible reinforcing threads that extend in the lengthwise direction of the belt; and which comprise a plurality of first curved or bent portions and a plurality of second curved or bent portions, respectively, in the lengthwise direction, such that the first curved or bent portions and the second curved or bent portions have opposite phases, respectively, and wrap around the voids, respectively.

3. A stretchable conveyor belt comprising:

widthwise portions extending normal to a lengthwise direction of the belt for support by respective rollers, each said widthwise portion comprising an intermediate portion having a thickness portion and at least one void in said thickness portion, wherein each said at least one void for imparting elasticity to each of the widthwise portions of the belt; and a plurality of wires that extend in a widthwise direction of the belt and comprise at least one layer on at least a first side of said at least one void of each of the widthwise portions of the belt, wherein the wires are for imparting transverse rigidity to the belt.

4. The stretchable conveyor belt according to claim 3, further comprising a widthwise central portion of the belt and a plurality of recesses, wherein in each of respective first surfaces of respective portions of the belt that are nearer than the respective voids of the widthwise portions of the belt to said widthwise central portion of the belt, said plurality of recesses extend in the widthwise direction of the belt and are located at regular intervals of distance in the lengthwise direction of the belt, and wherein the recesses are for cooperating with the voids to impart elasticity to the belt.

5. The stretchable conveyor belt according to claim 3, further comprising a widthwise central portion of the belt comprising rubber and being elastic.

6. The stretchable conveyor belt according to claim 3, wherein the plurality of wires comprise two layers on the first side and a second side of the void of each of the widthwise portions of the belt, respectively.

7. The stretchable conveyor belt according to claim 3, wherein the plurality of wires comprise at least one layer on the first side of a plurality of voids of each of the widthwise portions of the belt with no layers in a widthwise central portion of the belt, and wherein the belt further comprises a plurality of transverse rigid plates that extend in the widthwise direction of the belt and are located at a regular interval of distance in the length vise direction of the belt such that each of the transverse rigid plates is located between two adjacent voids of the plurality of voids, wherein the transverse rigid plates cooperate with the wires to provide the transverse rigidity of the belt.

* * * * *